United States Patent
Wanuga et al.

(10) Patent No.: US 12,284,532 B2
(45) Date of Patent: Apr. 22, 2025

(54) JOINT COMMUNICATION AND SENSING AIDED BEAM MANAGEMENT FOR NR

(71) Applicant: INTERDIGITAL PATENT HOLDINGS, INC., Wilmington, DE (US)

(72) Inventors: Kevin T. Wanuga, Souderton, PA (US); Sanjay Goyal, Deer Park, NY (US); Arnab Roy, Phoenixville, PA (US); Onur Sahin, London (GB); Alpaslan Demir, East Meadow, NY (US); Ravikumar V. Pragada, Warrington, PA (US); Mihaela C. Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 346 days.

(21) Appl. No.: 17/635,209

(22) PCT Filed: Aug. 14, 2020

(86) PCT No.: PCT/US2020/046363
§ 371 (c)(1),
(2) Date: Feb. 14, 2022

(87) PCT Pub. No.: WO2021/030685
PCT Pub. Date: Feb. 18, 2021

(65) Prior Publication Data
US 2022/0225121 A1 Jul. 14, 2022

Related U.S. Application Data

(60) Provisional application No. 62/887,330, filed on Aug. 15, 2019.

(51) Int. Cl.
H04W 16/28 (2009.01)
H04L 5/00 (2006.01)
H04W 24/08 (2009.01)

(52) U.S. Cl.
CPC .......... *H04W 16/28* (2013.01); *H04L 5/0048* (2013.01); *H04W 24/08* (2013.01)

(58) Field of Classification Search
CPC ..... H04W 16/28; H04W 24/08; H04W 24/10; H04W 72/046; H04W 72/23;
(Continued)

(56) References Cited

U.S. PATENT DOCUMENTS 10,848,232 B2 11/2020 Pan et al.
10,979,924 B2 4/2021 Tooher et al.
(Continued)

FOREIGN PATENT DOCUMENTS

WO 2014047253 A1 3/2014
WO WO-2018064327 A1 * 4/2018 ............. H04B 7/024

OTHER PUBLICATIONS

Da Silva et al., "Wi-Fi sensing: Usages, requirements, technical feasibility and standards gaps," IEEE 802.11-19/1293r0 (Jul. 15, 2019).
(Continued)

*Primary Examiner* — Ayaz R Sheikh
*Assistant Examiner* — David Zhijun Sun
(74) *Attorney, Agent, or Firm* — VOLPE KOENIG

(57) ABSTRACT

Methods and apparatuses for receive (Rx) beam selection are described herein. A wireless transmit/receive unit (WTRU) may be configured to receive, from a base station (BS), configuration information for joint communication and sensing (JCS) reference signals. The configuration information may include resources for reference signal transmission and resources for measurement reporting. The WTRU
(Continued)

may be further configured to receive, from the BS, an indication to activate a subset of the resources for JCS reference signal transmission. The WTRU may be further configured to transmit, a plurality of JCS reference signals using the activated subset of resources for reference signal transmission. The WTRU may be further configured to measure, via a plurality of Rx beams, a backscatter power associated with each of the transmitted plurality of JCS reference signals. The WTRU may be further configured to calculate beam blockage statistics based on the measured backscatter power.

20 Claims, 14 Drawing Sheets

(58) Field of Classification Search
CPC ... H04L 5/0048; H04L 5/0007; H04L 5/0057; H04L 5/0094; H04B 7/0695; H04B 7/088; H04B 7/0413; H04B 7/0626
See application file for complete search history.

(56) References Cited

U.S. PATENT DOCUMENTS

| | | | |
|---|---|---|---|
| 2011/0171949 A1* | 7/2011 | Liao | H04W 56/0045 455/422.1 |
| 2015/0382205 A1 | 12/2015 | Lee et al. | |
| 2018/0069681 A1* | 3/2018 | Chakraborty | H04W 72/04 |
| 2019/0207666 A1* | 7/2019 | Son | H04W 52/367 |
| 2019/0222279 A1 | 7/2019 | Xi et al. | |
| 2019/0349784 A1* | 11/2019 | Tang | H04L 41/08 |
| 2020/0275402 A1* | 8/2020 | Shi | H04W 76/11 |
| 2020/0358515 A1* | 11/2020 | Li | H04L 5/0053 |

OTHER PUBLICATIONS

Han et al., "Wi-Fi sensing," IEEE 802.11-19/1164r0 (Jul. 15, 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Samsung, "New WID: Further enhancements on MIMO for NR," 3GPP TSG RAN Meeting #86, RP-193133, Sitges, Spain (Dec. 9-12, 2019).
Third Generation Partnership Project, "Technical Specification Group Radio Access Network; Study on New Radio Access Technology Physical Layer Aspects (Release 14)," 3GPP TR 38.802 V14.2.0 (Sep. 2017).
Third Generation Partnership Project, "Technical Specification Group Radio Access Network; NR; Medium Access Control (MAC) protocol specification (Release 16)," 3GPP TS 38.321 V16.1.0 (Jul. 2020).
Third Generation Partnership Project, "Technical Specification Group Radio Access Network; NR; Medium Access Control (MAC) protocol specification (Release 15)," 3GPP TS 38.321 V15.9.0 (Jul. 2020).
Third Generation Partnership Project, "Technical Specification Group Radio Access Network; NR; Medium Access Control (MAC) protocol specification (Release 15)," 3GPP TS 38.321 V15.6.0 (Jun. 2019).
Third Generation Partnership Project, "Technical Specification Group Radio Access Network; NR; Physical layer procedures for data (Release 15)," 3GPP TS 38.214 V15.6.0 (Jun. 2019).
Third Generation Partnership Project, "Technical Specification Group Radio Access Network; NR; Physical layer procedures for data (Release 15)," 3GPP TS 38.214 V15.10.0 (Jun. 2020).
Third Generation Partnership Project, "Technical Specification Group Radio Access Network; NR; Physical layer procedures for data (Release 16)," 3GPP TS 38.214 V16.2.0 (Jun. 2020).
Third Generation Partnership Project, "Technical Specification Group Radio Access Network; NR; Medium Access Control (MAC) protocol specification (Release 15)," 3GPP TS 38.321 V15.5.0 (Mar. 2019).
Third Generation Partnership Project, "Technical Specification Group Radio Access Network; NR; Physical layer procedures for data (Release 15)," 3GPP TS 38.214 V15.5.0 (Mar. 2019).
Tang, "Research on Transmission Performance of Cognitive Radio Systems Based on Cooperative Communications," China Doctoral Dissertations (Dec. 15, 2011).

* cited by examiner

JOINT COMMUNICATION AND SENSING AIDED BEAM MANAGEMENT FOR NR

CROSS-REFERENCE TO RELATED APPLICATIONS

This application is the U.S. National Stage, under 35 U.S.C. § 371, of International Application No. PCT/US2020/046363 filed Aug. 14, 2020, which claims the benefit of U.S. Provisional Application No. 62/887,330, filed Aug. 15, 2019, the contents of which are incorporated herein by reference.

BACKGROUND

Joint Communication and Sensing (JCS) is a technology that may provide communication devices with radio frequency (RF) sensing and radar capabilities. The RF sensing and radar capabilities may be built on an enhanced communication framework. Since 5G technologies and systems may operate in upper frequency bands, for example, in the 28 GHz band, a convergence of the frequency bands used by different technologies such as radar and mobile communication systems is possible. Moreover, in recent years there has been a significant uptake in consumer devices with radar sensing capabilities. Given the convergence of the frequency bands between radar and mobile communications and the ubiquity of consumer devices with radar capability, technologies that can jointly handle communications and sensing on the same architecture/platform may be more cost effective and have lower complexity as compared to two independent platforms. Beam management procedures in systems with high frequency bands may incur large overhead, which increases with the use of higher frequency bands. The use of JCS capable devices may help to reduce overhead in beam selection procedures due to the capability of blockage sensing of receive beams. JCS capable devices may consider estimated blockage statistics to reduce the need for significant overhead in beam selection and beam failure recovery procedures. Thus, methods and apparatuses that efficiently enable JCS-aided beam management for New Radio (NR) are needed.

SUMMARY

Methods and apparatuses for receive (Rx) beam selection are described herein. A wireless transmit/receive unit (WTRU) may be configured to receive, from a base station (BS), configuration information for joint communication and sensing (JCS) reference signals. The configuration information may include resources for reference signal transmission and resources for measurement reporting. The WTRU may be further configured to receive, from the BS, an indication to activate a subset of the resources for JCS reference signal transmission. The WTRU may be further configured to transmit, a plurality of JCS reference signals using the activated subset of resources for reference signal transmission. The WTRU may be further configured to measure, via a plurality of Rx beams, a backscatter power associated with each of the transmitted plurality of JCS reference signals. The WTRU may be further configured to calculate beam blockage statistics based on the measured backscatter power.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
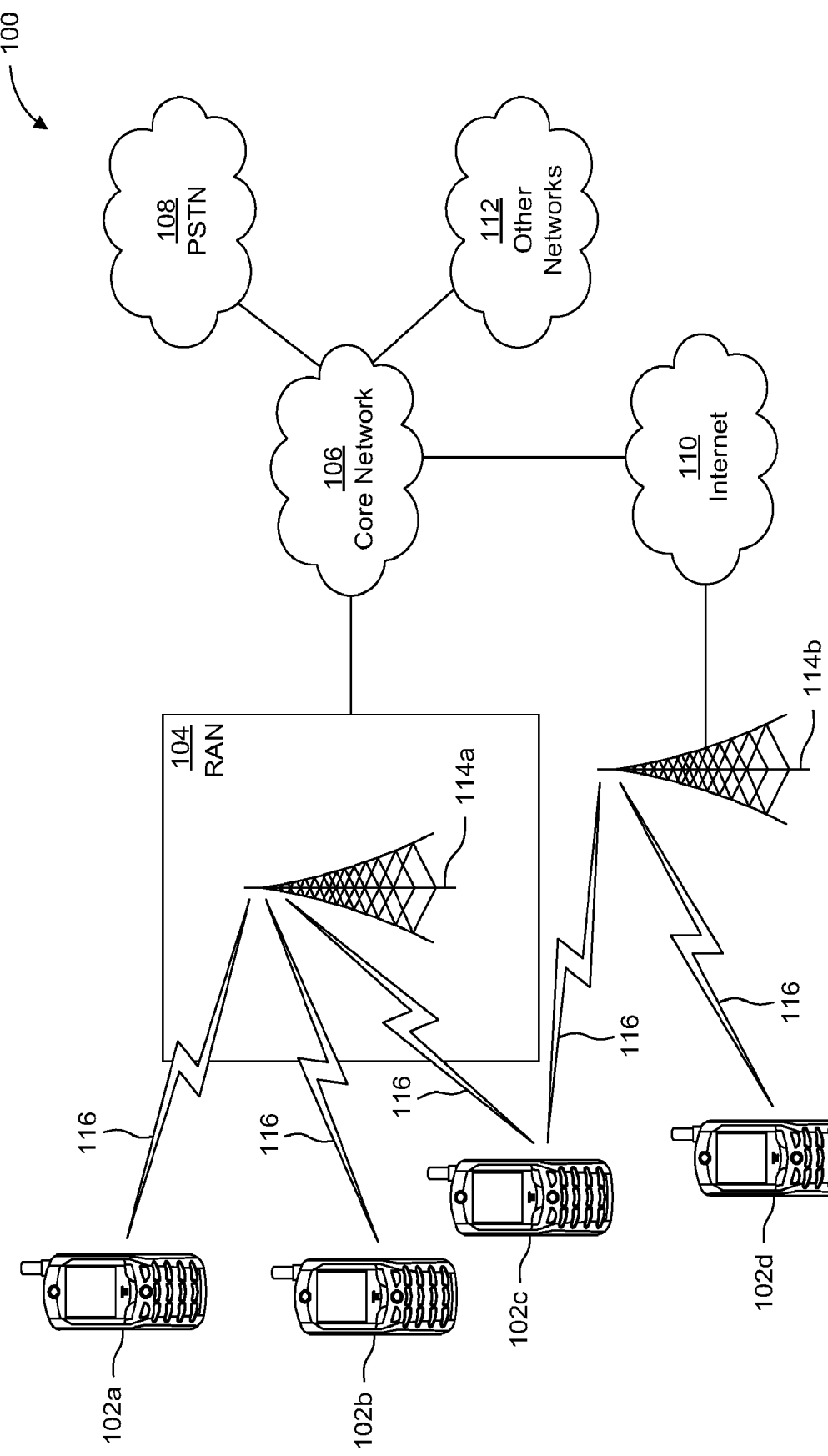
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (g NB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the aft interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
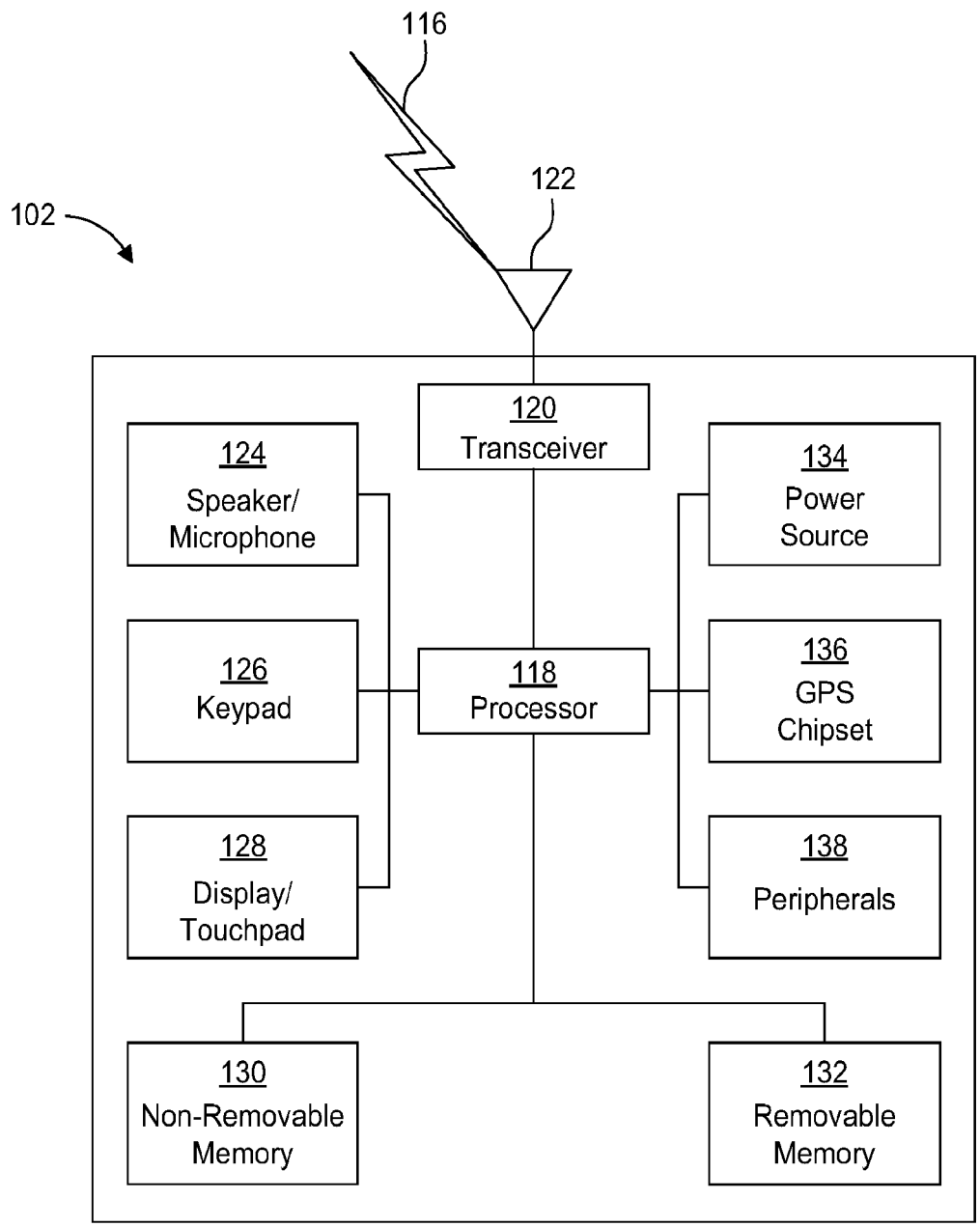
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
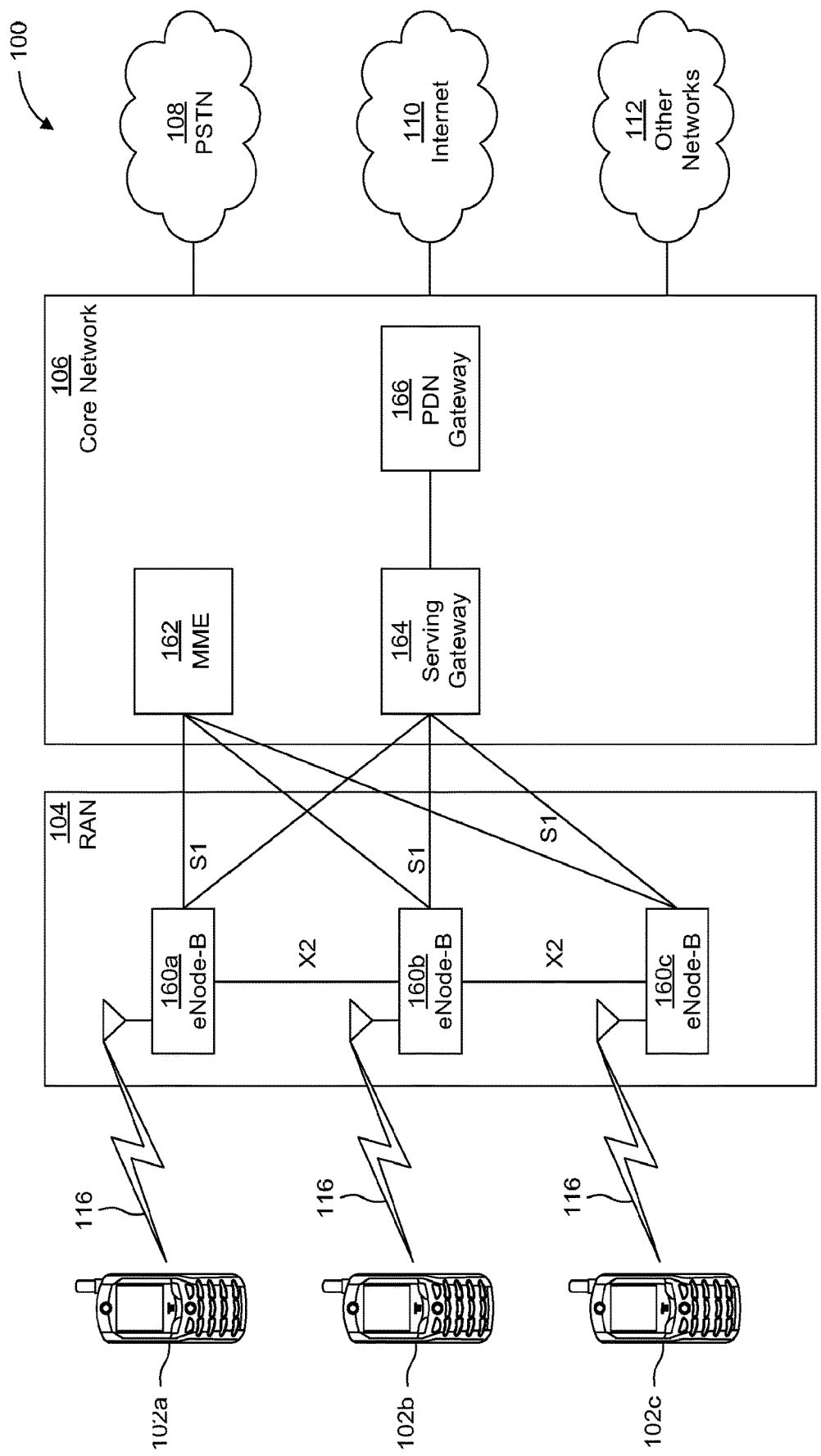
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the ON 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like, The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
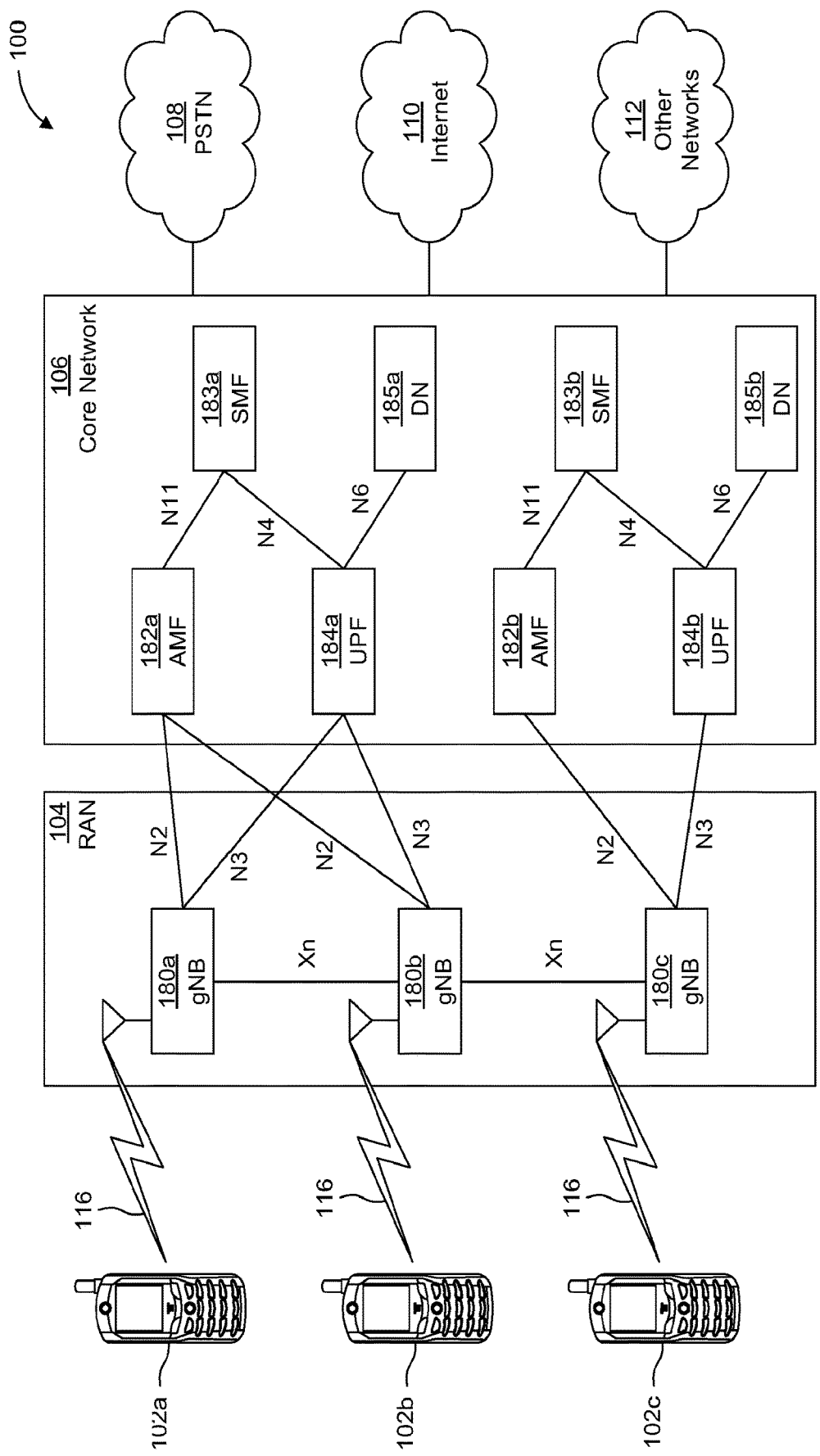
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following terminology may be used throughout this document. "Radar" may refer to Radio Detection and Ranging. "JCS" may refer to joint communication and sensing technologies or systems. "RadCOM" may refer to joint radar and communication technologies or systems. JCS and RadCOM may be used interchangeably herein. "JCS-RS" may refer to Joint Communications and Sensing Reference Signal. "TRP" may refer to Transmission and Reception Point. "CSI-RS" may refer to Channel State Information Reference Signal. "RNTI" may refer to Radio Network Temporary Identity. "C-RNTI" refers to Cell RNTI.

The continuous need for higher user data rates, increased cell capacity, reduced latency, support for IoT, and others led to the generation of the upcoming 5G wireless technologies. In addition to the traditional sub-6 GHz frequency bands that may be used by 4G and prior wireless technologies, 5G wireless systems may use higher frequency bands (e.g., bands above 6 GHz and in the mmWave spectrum), where large swaths of spectrum are available.

Due to the large available bandwidths in the mmWave, these bands may be useful for delivering very high data rates (addressing the Enhanced Mobile Broadband (eMBB) use case), and can also be used for enhanced positioning applications. While providing clear advantages in terms of available bandwidth, attainable data rates, increased accuracy for positioning, waves that propagate in the higher frequency bands (e.g., mmWave) may suffer from severe attenuation and blockage; to mitigate the path loss, highly directive systems (e.g., highly directive beamforming) are desirable. While beamforming is already used in 4G systems, the need for additional transmit (Tx)/receive (Rx) gains to compensate for the high path loss in mmWave may require even more directive systems. For example, 3GPP Releases 15 and 16 of the New Radio (NR) specifications may provide support for up to 64 beams for frequency ranges up to 52.6 GHz. However, it is expected that for frequencies above 52.6 GHz, the number of beams may further increase, and the corresponding beam widths may also decrease (leading, for example, to the use of "pencil" beams).

To maintain the link for directive systems supporting a high number of beams/narrow beams, and to mitigate the impairments specific to mmWave bands (e.g., blockage and/or misalignment of beams), beam management procedures are needed. While Releases 15 and 16 of the 3GPP NR specifications define beam management procedures for frequency bands below 52.6 GHz, there may be a large overhead requirement associated with beam management. The overhead is likely to increase as the number of beams increases and the beam width decreases for higher frequency bands.

The availability of large amounts of spectrum (e.g., large channel bandwidths) also enables other applications such as enhanced positioning, as large channel bandwidths may lead to increased resolution in ranging and/or positioning. Enhanced positioning information furthermore may provide high resolution detection of objects in an environment, therefore resulting in a clearer physical estimation of the operating environment, also known as a radio environment mapping. For wireless networks, this may imply detection of static and/or mobile obstacles and multi-path characteristics, which may be critical for configuration and optimization of these systems.

Since ranging (e.g., radar), enhanced positioning, and high data rate communication applications may all benefit from the use of wide channel bandwidths, it may be beneficial to consider technologies that jointly address communications and sensing. Joint Communications and Sensing (JCS) technologies may help reduce complexity and cost by using a common framework for seamless and coordinated operation of communication layers and in-band radar.

Examples of key performance indicators of radar systems are described herein. The two most basic functions of radar are inherent in the word radar, which is itself an acronym for the phrase "radio detection and ranging." Additionally, the ability to determine bearing, or angular position of a target with respect to the transmitter, has been made available through directional transmission of radar signals. Finally, the estimation of a target's velocity from the target's Doppler frequency has become a fundamental function of radar systems as well.

Detection, as a fundamental function of radar, may refer to a system's ability to discriminate between a target and background noise and radar clutter of the environment in which the target resides. Key performance indicators of a radar's detection capability may include, but are not limited to, detection range and resolution, or the radar's ability to distinguish between multiple targets on the same bearing and/or range to the radar system.

Detection range may generally be improved by increasing transmit power and/or receiver sensitivity of the radar system, but may also be affected by the radar's operating frequency, which may result in both different path loss of the radar signal and a different radar cross section (RCS) of the target being detected. RCS may refer to the measure of a target's ability to reflect radar signals in the direction of the radar receiver. The RCS may be a function of the material composition of the target, the target's bearing, orientation and geometry, as well as the frequency of the radar signal being used for detection. Range resolution may be a function of a radar pulse's duration, in non-coherent systems, or a radar pulse's bandwidth, in coherent detection.

A radar's ranging capability may refer to the radar system's ability to estimate the distance of the target to the radar receiver. Ranging accuracy may be characterized as a ranging resolution, which refers to both the margin of uncertainty for a radar system's range estimate and the minimum distance between two targets such that the radar system can detect both objects. In non-coherent radar detection, the radar system's range resolution may decrease linearly with the radar transmission's pulse width, while with a coherent detector, the range resolution may be improved linearly with system bandwidth.

A target's bearing, or angular position relative to the radar, may be obtained from directional transmission of radar signals to isolate reflections from a limited direction of arrival. In analog beamforming, the limit of angular resolution may be determined by the beam width of the radar transmission. Angular resolution may be improved with smart array radar systems, where the limiting factor may be the estimation error from system noise.

Estimating a target's velocity may be a capability of radar enabled by the Doppler shift of signals reflected off of the target while it is in motion. A shift in the frequency of the reflected waveform relative to the transmitted waveform may indicate target mobility proportional to the magnitude of the frequency shift. Estimating target velocity can be made challenging by the presence of multiple targets and/or multi-path reflections, which may require sophisticated algorithms to isolate target sources and lead to estimate instability. Additionally, estimating the velocity of an accelerating target may complicate velocity estimation.

Figure 2:
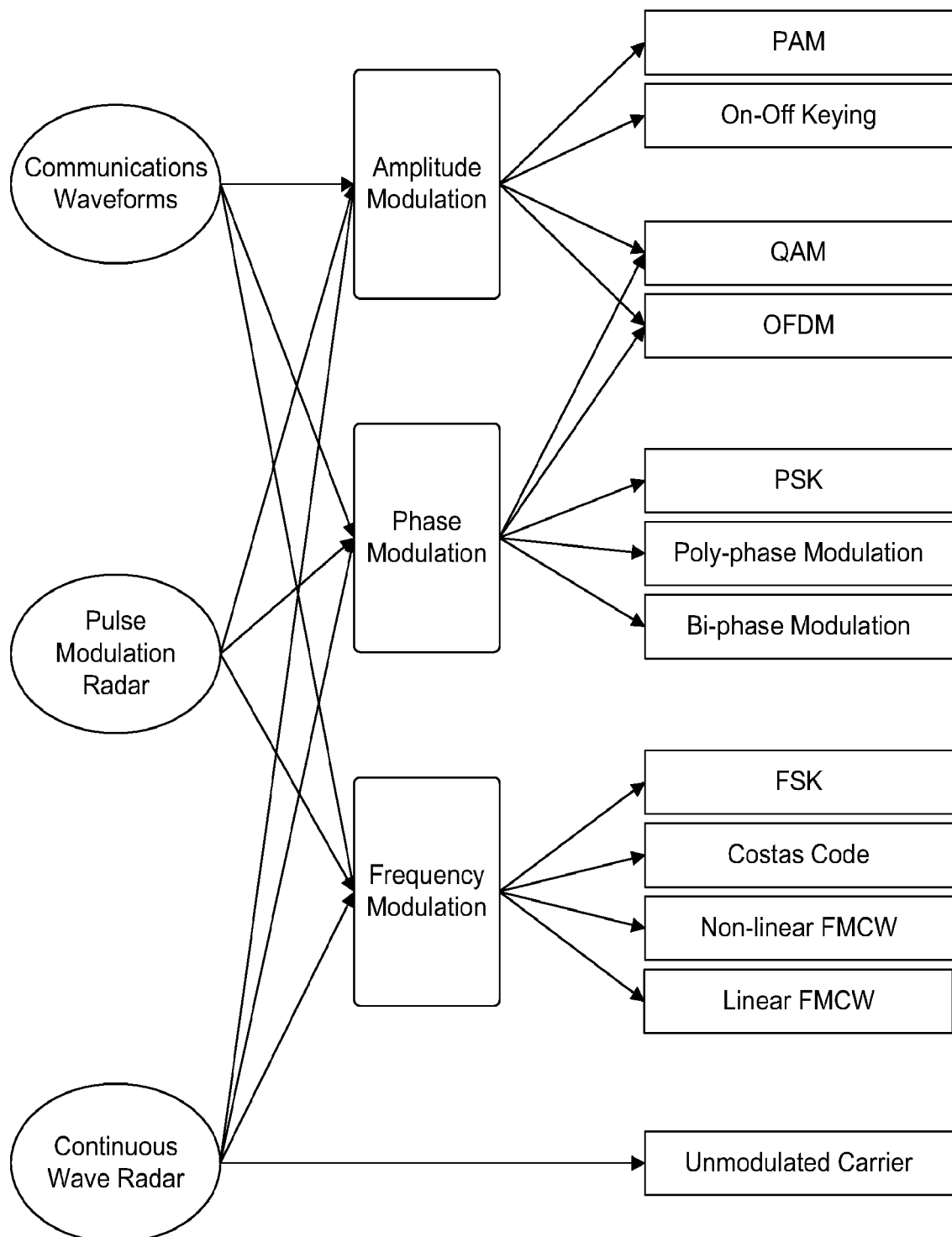
FIG. 2 is a diagram illustrating an example taxonomy of both radar and wireless communication waveforms.

FIG. 2 illustrates an example taxonomy of both radar and wireless communication waveforms. As shown in FIG. 2, radar waveforms may broadly be classified into continuous wave radar or pulse modulation radar. Continuous wave radar may refer to radar architectures in which a radar signal is transmitted and received continuously, while pulse modulation radar may refer to systems in which the transmission and reception are duplexed in time. As in communication, radar waveforms may also make use of phase, frequency, and amplitude modulation to aid in the detection of targets.

Furthermore, a system using a given architecture (e.g., orthogonal frequency division multiplexing (OFDM)) may be modulated using multiple different methods (e.g., both or either phase and amplitude modulation in the case of OFDM).

Pulsed radar may emit short pulses and, in a silent period, receive echo signals. This method may be characterized by very short transmission pulses followed by very large pauses, which may also be referred to as receiving times. Pulsed radar systems may be more naturally capable of estimating target range and bearing, particularly in the presence of multiple targets, but may suffer from a minimum detection range determined by the time the signal must propagate before the radar can transmit the radar pulse and switch to receive mode to detect the reflection.

Continuous wave (CW) radar systems may emit electromagnetic radiation at all times. A CW radar system transmitting an unmodulated signal may be unable to measure the speed of a reflecting target using the Doppler effect. Thus, in some cases, CW radar systems may be unable to measure range and unable to differentiate between two or more targets. In other cases, it may be possible to use a CW radar system to measure range by employing frequency modulation, giving rise to Frequency Modulated Continuous Wave (FMCW) radars. By measuring the frequency of the returning signal, the time delay between the transmission and reception may be measured and therefore, the range may be determined.

An advantage of CW radar system may be that energy is not pulsed, which may result in a system that is simpler to manufacture and operate. Such systems may have no minimum or maximum range, although the transmit power may impose a practical limit on range. Continuous-wave radar may maximize total power on a target because the transmitter may be broadcasting continuously. On the other hand, a pulsed radar system typically may provide greater measurement range compared to a CW radar, such as an FMCW radar system, with lower power consumption.

Continuous waveform radar systems may not suffer from a minimum ranging distance and may offer a more natural framework for estimating a targets velocity, but such systems may perform sub-optimally in multi-target scenarios, or scenarios involving rich multipath propagation.

For the purposes of designing radar waveforms that can coexist optimally with modern wireless and mobile communication systems, a natural selection of waveform may include pulsed phase and amplitude modulated waveforms. These types of signals may be most similar to those of wireless communications standards in broad use globally.

Figure 3:
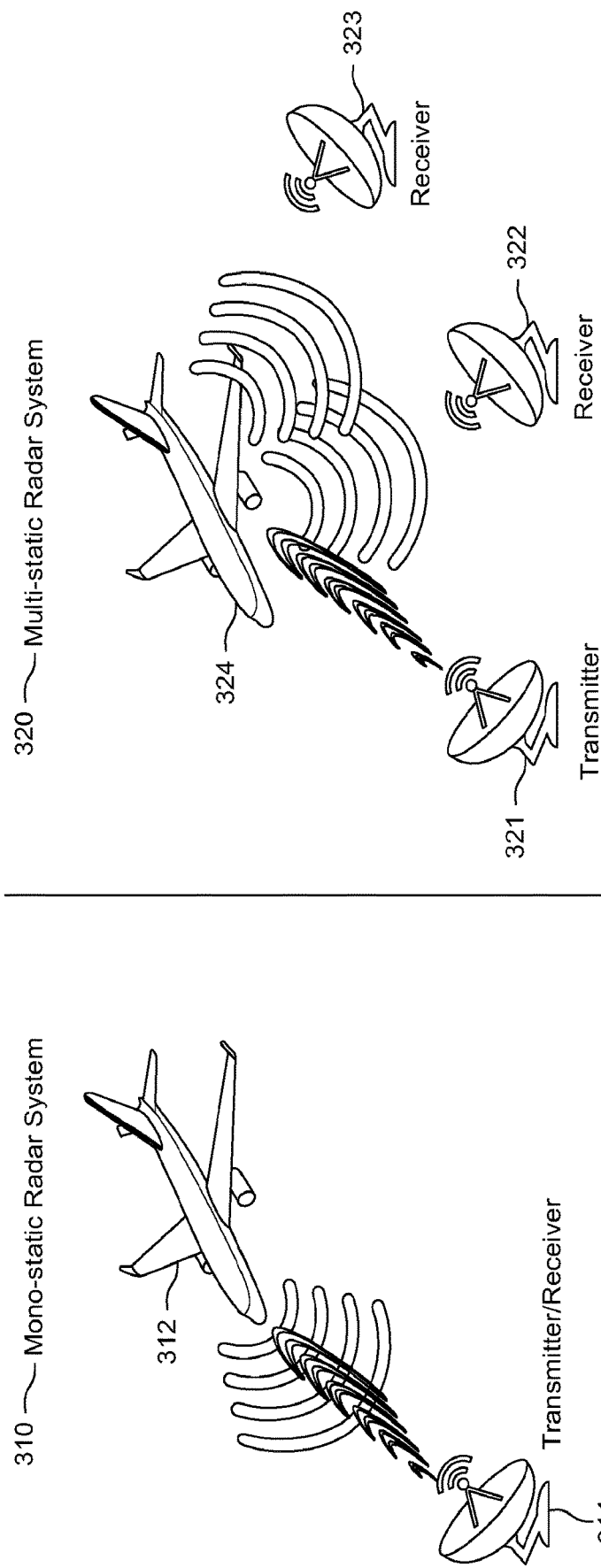
FIG. 3 is a diagram illustrating two example radar architectures.

FIG. 3 illustrates two examples of radar architecture types. As illustrated in FIG. 3, radar architectures may be classified as mono-static, in which the transmitter and receiver may be co-located, or multi-static, in which one or more radios perform transmission and reception is performed by one or many devices at a separate location. As shown in FIG. 3, a mono-static radar system 310 may include a combined transmitter/receiver unit 311. The transmitter/receiver unit may both direct a transmit signal toward a target 312 and subsequently receive the reflected signal. As is further shown, a multi-static radar system 320 may include a transmit radio 321, and multiple receivers 322 and 323. The transmit radio 321 may direct a transmit signal toward a target 324, and the receivers 322 and 323 may receive the reflected signal. In embodiments not shown, a multi-static radar system may include multiple transmitters and multiple receivers, multiple transmit radios with a single receiver, or a single transmitter with a single receiver at a separate location (also known as bi-static radar system). Where more than one transmitter and/or more than one receiver is used, all or a subset of the transmitters and/or radios may be co-located with other transmitters or receivers of the system.

Mono-static radar architectures may be simpler, making use of a single radio architecture to limit challenges with time and frequency synchronization, but may have issues with a lack of signal diversity. Mono-static radar architectures may offer poor performance in non-line of sight (LOS) scenarios, or may have sub-optimal detection performance with objects of small RCS. Detection performance and range may be increased with multi-static architectures at the cost of implementation complexity required to coordinate transmission and reception between multiple disparate radios.

It may be possible to conceive mono-static, bi-static and multi-static radar architectures with existing wireless communications hardware, where the reflections of the transmitted signal may be observed by the radio that originally made the transmission or the device that was configured to receive it. Monostatic architectures, however, may have issues with a minimum ranging distance, due to differences in waveform design between radar systems and communications systems. If wireless devices do not have full-duplex capability, large transmission periods may result in impractically large minimum ranging distances. This limitation can be overcome with multi-static or bistatic architectures, although network topologies need to enable point-to-point and point-to-multi-point transmission for optimal design.

Conventional communications hardware may be valuably repurposed for wireless sensing. Making use of existing wireless chipsets for wireless sensing may enable new classes of services that can be deployed rapidly and achieve fast market penetration with little infrastructure expense, owing to the ubiquity of these chipsets now present in wireless handsets, vehicles, and IoT devices. New applications that have been demonstrated in proof-of-concept are shown in Table 1.

TABLE 1

| Use Case | Applications |
| --- | --- |
| Health Monitoring | Heartbeat Detection |
|  | Respiration Rate Monitoring |
|  | Sleep Apnea Detection |
|  | Fall Detection |
| Gesture Recognition | Human Activity Recognition |
|  | Keystroke Detection |
|  | Sign Language Recognition |
|  | Lip Motion Recognition |
| Context Acquisition | Localization |
|  | Direction Finding |
|  | Range Estimation |
| Device Authentication | Access Control |
|  | Intrusion Detection |
|  | Abnormality Detection |

A variety of models/devices/systems for enabling this wireless sensing technology in existing wireless networks are described herein. In some examples, touchless sensor and machine learning hardware platforms for health analytics may be provided. With such platforms, Wi-Fi signals may be used to track vital signs (e.g., pulse, breathing rate, etc.), in addition to tracking human posture and gestures. The technology may rely on proprietary RF transceivers with custom-made antenna structure specialized for sensing for the frequency bands in the range of 5 GHz-7 GHz. The underlying sensing modulation and waveform may be based on FMCW technology, which may be used to separate RF reflections based on the distance of the reflecting objects. The micro-doppler and phase variation characteristics of the received signals may be detected by machine learning-based filtering methods, which may then be used to distinguish or detect the features of the objects.

In some examples, modified Wi-Fi mesh routers, which may create a sensor network capable of providing smart car child presence detection, smart home presence monitoring, well-being and sleep monitoring and indoor tracking and navigation, may be offered. Software that enables Wi-Fi-based sensing data to be extracted from existing Wi-Fi routers and network deployments may also be provided. Cloud-based applications that enable enterprise Wi-Fi operators to provide additional tracking and analytics tools based on Wi-Fi-based sensing data may be offered. Hardware and software modules that make use of UWB (IEEE 802.15.4a) to enable positioning and communications solution may be offered. In some examples, chips and software development kits (SDKs), which use proprietary 60 GHz waveforms to perform touchless gesture recognition may be offered. Custom-made radar solutions specialized for battery-powered, end-user devices, such as mobile phones are one such example. The underlying technology may operate at 60 GHz ISM bands, and may be based on FMCW and DSSS modulation classes. The higher frequency bands in which such solutions operate, for example, due to availability of spectrum and smaller antenna architectures in these bands, may enable higher resolution applications such as hand/finger gesture recognition.

Examples of beam management are described herein. In NR, beam management may be defined as a set of Layer 1 and/or Layer 2 (L1/L2) procedures to acquire and maintain a set of TRP(s) and/or WTRU beams that can be used for DL and UL transmission/reception. Beam management may include at least one of several aspects, including beam determination, beam measurement, beam reporting, or beam sweeping. Beam determination may involve one or more TRPs or WTRUs selecting from their own Tx/Rx beam(s). Beam measurement may involve one or more TRPs or WTRUs measuring characteristics of received beamformed signals. Beam reporting may involve a WTRU reporting information of one or more beamformed signals based on beam measurement. Beam sweeping may involve operations covering a spatial area, which beams transmitted and/or received during a time interval in a predetermined way. Although these procedures may be referred to in the context of 5G NR, the concepts described herein may be applicable to systems implementing other technologies, such as Institute of Electrical and Electronic Engineers (IEEE) 802.11 wireless local area networks.

As part of an initial access procedure, a WTRU and a base station (e.g., gNB) may need to identify a pair of beams (gNB/TRP Tx beam and WTRU Rx beam) for the downlink communication. This procedure may be referred to as the "P1", or "beam selection" procedure. For P1, the gNB/TRP may sweep the Tx beam to enable the WTRU to perform measurements on different gNB/TRP Tx beams and select the TRP Tx beams and/or WTRU Rx beam(s).

Procedure "P2", also known as "beam refinement for the gNB Tx beam" procedure, may be used to enable a WTRU to perform measurements on different Tx beams to possibly change between TRP Tx beams at the same or different TRPs. This procedure may be run on a smaller set of beams and/or beams with lower beam-widths than procedure P1 (beam selection) and may be viewed as a special case of P1.

Lastly, procedure "P3" may be used to enable the WTRU to perform multiple measurements on the same gNB/TRP Tx beam to change the WTRU Rx beam in the case the WTRU uses beamforming. This procedure may also be referred to as "beam refinement for the WTRU Rx beam".

Joint communication and sensing may be referred to herein as a technology that provides communication devices with RF sensing and radar capabilities. The RF sensing and radar capabilities may be built on an enhanced communication framework (e.g., antenna/processor/memory/systems in infrastructure devices, base stations, UEs, WTRUs, stations, access points, or the like).

As previously mentioned, 5G technologies and systems may be designed to also operate in the upper frequency bands, for example in the 28 GHz band. This indicates a convergence of the frequency bands used by different technologies, such as radar and mobile communication systems. Moreover, a significant increase has been seen in consumer devices having radar sensing capabilities. Given the convergence of the frequency bands between radar and mobile communications and the ubiquity of consumer devices with radar capability, technologies that can jointly handle communications and sensing on the same architecture/platform may be more cost effective and have lower complexity as compared to two independent platforms.

The use of Joint Communication and Sensing capable nodes may enable a broad range of applications. Such applications may include, but are not limited to: indoor sensing, automotive/V2X, industrial IoT applications, and real-time radio-environment maps. For indoor sensing, nodes can detect and monitor physical activity, which may further be enhanced with activity classification, to classify human movement, posture, fall detection, vitals monitoring (e.g., heart beat), intrusion detection and more. For the automotive/vehicle-to-everything (V2X), nodes perform simultaneous radar and V2X communications, and may perform real-time updates of the environment and road maps. For the industrial IoT applications, large scale deployment of nodes may enable warehouse indoor localization. The real-time radio-environment maps may be built using enhanced communication devices.

Referring again to the procedures P1, P2, and P3, described above with regards to initial access, various improvements may be desirable so as to enhanced beam management. During a WTRU Rx beam selection procedure (P3), a base station (e.g., gNB) may transmit multiple or repeated CSI-RSs using the same spatial domain transmission filter (i.e. the same beam). The number of CSI-RS repetitions may equal the number of WTRU receive beams reported for the WTRU's capabilities. However, some of these transmissions may be wasted since corresponding WTRU Rx beams may be blocked. Additionally, the number of repetitions that are blocked may change over time due to WTRU mobility. This may result in wasted network resources, thus leading to increased overhead. Therefore, methods and apparatuses that can reduce the overhead of the CSI-RS transmissions associated with the P3 procedure are desirable.

For the base station's Tx beam selection (e.g., in the P1 or P2 procedures), a WTRU may select a beam based on a signal quality of downlink (DL) transmissions. However, this may not consider the blockage statistics for that beam. It is possible that the WTRU may receive a beam from a different TRP with smaller blockage probability, but with similar or worse DL channel quality. Methods and apparatuses that account for the estimated blockage statistics are desirable for beam selection.

Lastly, when an WTRU detects that beam failure has occurred, the WTRU may trigger beam failure recovery based on DL channel quality measurements. However, this process may have significant overhead, and it may be slow. Methods and apparatuses that accelerate the beam failure recovery and reduce associated signaling overhead are desirable.

Embodiments for blockage detection-based beam selection are described herein. A WTRU may be configured to transmit reference signals (RSs) for the purpose of sensing (e.g., detection of objects in proximity) at specific times. The RSs may be used for joint communication and sensing (JCS) or may be dedicated for sensing. The RS configuration may include, but is not limited to, at least one of: a periodicity and offset, a repetition (the number of symbols or beams on which the RS may be transmitted repeatedly), a starting symbol and symbol offset (in case of non-contiguous symbols are allocated), a starting physical resource block (PRB), a number of PRBs, a PRB offset, an RE offset and RE density (number of REs per RB per port), a number of ports, power control parameters, and parameters to derive a unique WTRU RS sequence (e.g., sequence ID, cyclic prefix, etc.).

An RS configuration may be communicated to the WTRU in RRC signaling (e.g., in an RRC configuration message) and may be activated as soon as WTRU enters the RRC connected state. Alternatively or additionally, the RS configuration may be received in an RRC configuration and a separate activation or deactivation message may be received in a downlink Medium Access Control-Control Element (MAC-CE) or in downlink control information (DCI) over a downlink control channel. The downlink control channel may be masked or scrambled (e.g., with a cyclic redundancy check (CRC)) using the WTRU's RNTI (e.g., C-RNTI). Alternatively or additionally, the RS configuration and activation may be received simultaneously in DCI over a downlink control channel scrambled with the WTRU's RNTI (e.g., C-RNTI). A new identity (e.g., JCS-RS-RNTI) may be allocated by the network (e.g., by a gNB, eNB, or base station (BS)) for this purpose, which the WTRU may use to de-scramble the DCI containing the RS configuration. Alternatively or additionally, the RS configuration may be received in signaling over the downlink shared channel, where the resources for the shared channel may be indicated in DCI scrambled using the WTRU's RNTI (e.g., C-RNTI, JCS-RS-RNTI).

Alternatively or additionally, other uplink RSs configured for the WTRU (e.g., sounding reference signals (SRSs), and/or demodulation reference signals (DMRSs)) may be used for the purpose of sensing.

In order to perform sensing, the WTRU may transmit RSs on the configured resources. After the transmission of RS, the WTRU may monitor and perform measurements of the backscatter. To make backscatter measurements, the WTRU may perform at least one of several procedures. For instance, the WTRU may measure received power of the backscatter; measure phase of the backscatter; estimate the channel impulse response of the backscatter and/or relevant parameters of channel impulse response (e.g., round-trip-time, delay spread, path-loss, etc.); and/or perform cross-correlation between the received backscatter and the sequence used to transmit the RSs.

The WTRU may be configured to make measurements with different frequency domain granularity, for example, on a wideband or/and sub-band basis. For sub-band based measurements, the configuration of sub-bands (i.e., number of sub-bands, number of physical resource blocks (PRBs) per sub-band, starting PRB for each sub-band, etc.) may be given to the WTRU. In some embodiments, for example, in the case of beam-based systems, the WTRU may monitor and measure backscatter on the receive beam or beams corresponding to the transmit beam or beams used for transmitting RSs.

Embodiments for the determination of beam blockage rate are described herein. Based on backscatter measurements, a WTRU may be configured to report at least one of: a number of blocked beams, a beam blockage rate, an Rx signal strength on the back-scatter signal for each beam, or wideband or sub-band based measurements.

In some embodiments, the reporting (i.e. beam blockage reporting) may be configured as periodic, semi-persistent, or aperiodic reporting. The time-frequency resources (e.g., periodicity and offset, symbols indices or starting symbol and a number of contiguous symbols, physical resource block (PRB) indices or a starting PRB and number of contiguous PRBs) for reporting may be configured over an uplink control channel (e.g., physical uplink control channel (PUCCH)) or a uplink shared channel (e.g., physical uplink shared channel (PUSCH)).

Parameters of a beam blockage reporting configuration may include, but are not limited to, at least one of: time-frequency resources (e.g., using PUCCH or PUSCH); reporting quantity (e.g., a number of blocked beams, or/and beam blockage rate, etc.); one or more parameters associated with blockage detection (e.g., a detection threshold, etc.); or N, the number of measurement cycles for which to derive average statistics.

The reporting configuration may be communicated to the WTRU (e.g., in an RRC configuration or system information). Alternatively or additionally, the given reporting configuration (e.g., communicated in an RRC configuration) may be activated or deactivated later by sending an activation or deactivation command using the downlink control channel. The command may be signaled over the downlink channel using downlink control information (DCI) scrambled or masked with an identifier, such as the WTRU's RNTI.

By monitoring and measuring the backscatter of the transmitted RSs over a receive beam, the WTRU may determine the blockage in the direction of that beam. The WTRU may use a detection threshold to detect the blockage. For example, if the received backscatter power over a receive beam is greater than the detection threshold, the WTRU may declare it as a blocked receive beam. In some embodiments, the WTRU may declare it as an un-blocked receive beam. The detection threshold may be communicated to the WTRU, for instance, as a part of the beam blockage reporting configuration.

The WTRU may perform blockage detection for each of the beams on which RSs are transmitted for the purpose of sensing. Based on the blockage detection, the WTRU may compute the number of blocked beams out of the total number of beams on which the measurements were performed. If the WTRU is configured to report beam blockage rate, the WTRU may determine that the WTRU uses the measurement of number of blocked beams over multiple periods (e.g., N, which may be configured for the WTRU as a part of the beam blockage reporting configuration). For example, the WTRU may compute the beam blockage rate by taking the average or median of number of blocked beams over the N measurement periods. The WTRU may compute beam blockage rate by taking a simple average over the N measurement periods (e.g., sum of blocked beams over the last N measurement periods divided by N). Alternatively or additionally, the WTRU may compute beam blockage rate by taking exponential moving average. For example, an exponential moving average at the Kth reporting instance (i.e. average(K)), may be calculated using Equation 1, shown below:

$$\text{Average}(K) = W * \text{Average}(K-1) + (1-W) * \text{Measurement}(K) \quad \text{Equation 1}$$

As expressed in Equation 1, Measurement(K) may be the number of blocked beams observed by the WTRU in the latest measurement period (e.g., Kth period), and W may be a weighting factor, which many be communicated to the WTRU, for instance, as a part of the beam blockage reporting configuration.

Alternatively or additionally, the WTRU may be configured to report the beam blockage statistics for one or more specific beams. The beam indication may be defined with respect to the serving beam. For example, the WTRU may be configured to report the beam blockage rate of a group of beams covering a first angle 'theta' from the right side ('clockwise') of the serving Rx beam. The WTRU may be configured to report one or more beam blockage reports along with one or more the beam indications/identifications (e.g., a beam number, direction, theta, associated (quasi co-located) synchronization signal block (SSB) ID or SRS ID or CSI-RS ID, etc.).

In some embodiments, for each of the reporting instances/resources, the WTRU may prepare a report containing required beam blockage statistics (e.g., number of blocked beams, or/and beam blockage rate, or/and Rx signal strength on the back-scatter signal for each beam) for each configured wideband or sub-band and may send it to the network (e.g., gNB/eNB/BS) on the configured resources.

In some embodiments, the network (e.g., gNB/eNB/BS) may use beam blockage statistics received in one or more beam blockage reports from a WTRU to determine one or more parameters for the WTRU. For example, the network may determine the number of CSI-RS resources needed to be configured for the purpose of the WTRU's receive beam sweeping. This may be the number of CSI-RS resources that need to be configured in one or more CSI-RS resource sets with "repetition=ON" configured for the WTRU. In some examples, the network (e.g., gNB/eNB/BS) may use beam blockage statistics received in one or more beam blockage reports from a WTRU to determine a number of SRS resources needed to be configured for the WTRU. Alternatively or additionally, the beam blockage statistics, along with one or more beam indications from the WTRU, may be used to derive a mobility pattern of the obstacles or the WTRU.

Figure 4:
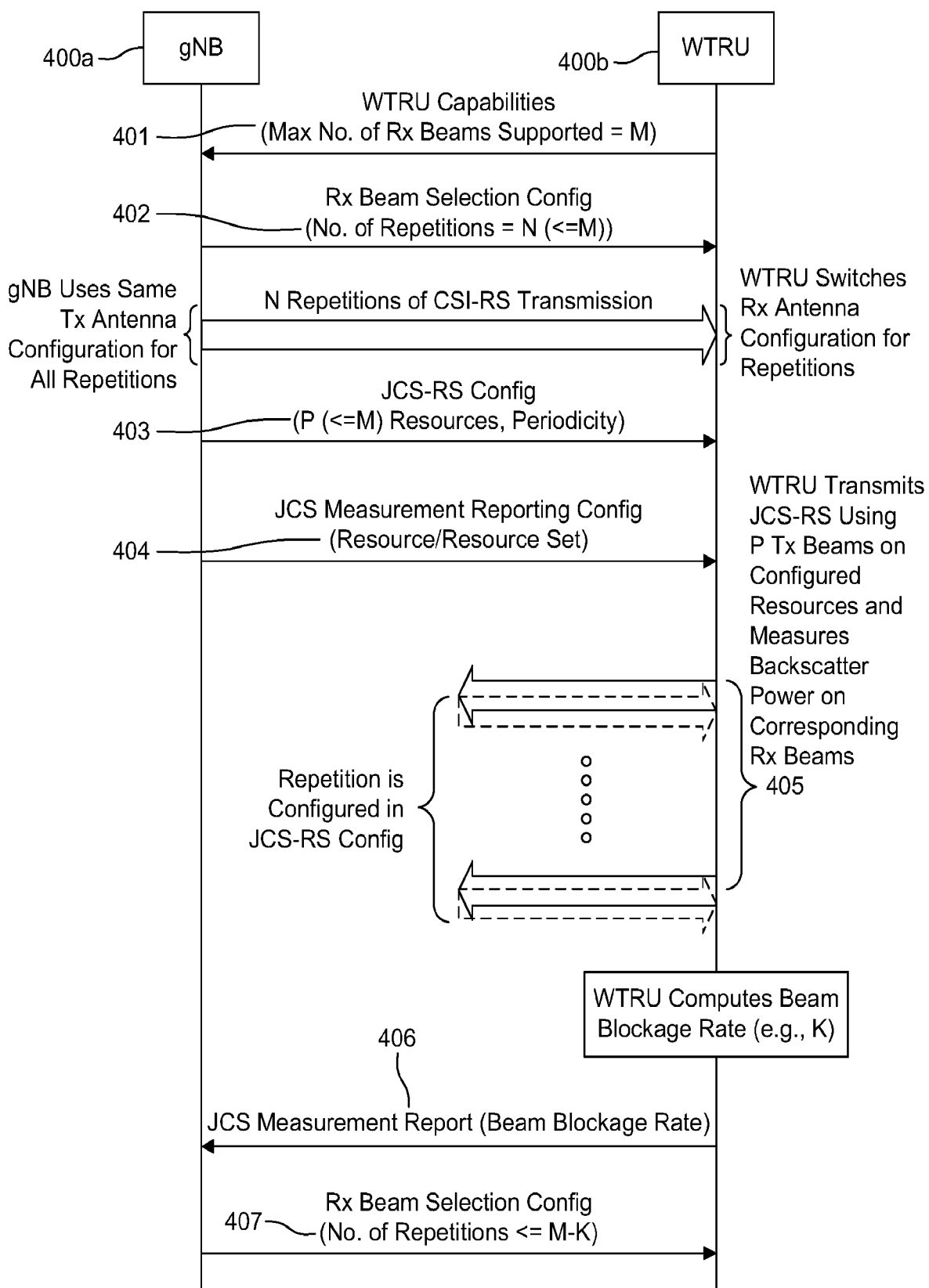
FIG. 4 is a diagram illustrating an example beam management configuration adaptation based on WTRU beam blockage rate reporting.

FIG. 4 illustrates an example beam management configuration adaptation based on WTRU beam blockage rate reporting. As shown in this example at 401, a WTRU 400b may provide a gNB 400a with parameters representing the capabilities of the WTRU, such as a maximum number of Rx beams that the WTRU supports. At 402, the WTRU 400b may be configured by the gNB 400a with a number of CSI-RS transmission repetitions for WTRU Rx beam selection. In some embodiments, the number of CSI-RS repetitions, N, may be less than or equal to the maximum number of Rx beams that the WTRU can support. In some embodiments, the gNB may use the same Tx antenna configuration for all repetitions, and the WTRU may switch the Rx antenna configuration for each repetition.

Further, for the WTRU 400b to determine obstacles in different directions, it may be configured with P resources for JCS-RS transmissions and measurement as shown at 403. In embodiments as shown, P may be less than or equal to the maximum number of Rx beams that the WTRU can support. The WTRU may be configured with resources or resource set to report JCS measurements. The resources for JCS-RS transmissions and measurements and the resources for measurement reporting may be specified in the same configuration, or separately, at shown by 403 and 404.

As shown at 405, the WTRU may transmit JCS-RSs in configured resources and measure backscatter power using corresponding Rx beams. The WTRU may use different beams to repeat transmissions and use corresponding Rx beams if multiple resources are configured in a resource set. At 406, the WTRU may compute the beam blockage rate based on the measured backscatter power, according to embodiments described herein, for example. Using the resources configured for JCS measurement reporting, the WTRU may transmit the report containing a beam blockage rate, which may be expressed as K, as in this example. Subsequently, the WTRU may receive a new Rx beam selection configuration containing a different number of resources (less than or equal to M-K in this example), shown at 407.

Embodiments for re-configuration of backscatter measurement and blockage reporting are described herein. In some embodiments, periodicity change may be signaled implicitly. Different rates of backscatter measurement and blockage reporting may be required based on one of more factors. Such factors may include, for example, WTRU mobility or the specific deployment scenario (e.g., a busy road, mountain, house, etc.). For instance, for a static WTRU (or a WTRU having very little mobility), a slower rate of backscatter measurement and blockage reporting may be suitable, whereas for a WTRU with high mobility, a faster rate of backscatter measurement and blockage reporting may be suitable. Alternately or additionally, the rate of change of channel characteristics between the transmitter and the receiver may determine reporting periodicity requirements. In order to enable the WTRU to operate in accordance with such measurement and reporting requirements, in some embodiments, a WTRU may be configured with multiple sets of resources for RS transmission for backscatter measurements. Each set may differ in at least one of several parameters. Such parameters may include a periodicity; a repetition; a starting symbol and symbol offset (in case of non-contiguous symbols are allocated); a starting PRB, a number of PRBs and PRB offset; an RE offset and RE density (number of REs per RB per port); and/or a number of ports.

In some embodiments, the WTRU may be configured with multiple sets of resources for reporting blockage statistics. Each set may be different with respect to at least one of the parameters for reporting, such as periodicity in the case of periodic reporting. The multiple configuration sets of resources for RS transmission and reporting may be communicated to the WTRU, for example, via an RRC configuration.

An initial or default selection of one set of resources for RS transmission and one set of resources for blockage reporting may be communicated to the WTRU, for example in an RRC configuration, via a downlink MAC-CE message, or via downlink control information (DCI) transmitted over a downlink control channel.

One or more parameters may be configured to the WTRU for implicit activation or de-activation of a resource set for RS transmission and/or blockage reporting. Examples of the parameters for implicit activation or de-activation of a resource set for RS transmission and/or blockage reporting may include, but are not limited to: a periodicity threshold 1 (e.g., T1) and computation methodology, and periodicity threshold 2 (e.g., T2). The computation methodology may use, for example, a "one step always" method or a "functional" method (with other parameters, e.g., a step threshold), etc.

In some embodiments, a periodicity threshold 1 (T1) may be used by the WTRU to determine the periodicity of the resources for RS transmission and blockage reporting. The periodicity threshold 1 (T1) may refer to the measurement value change that, when exceeded, triggers an increase in rate of the RS transmission and the blockage reporting (or decreasing the rate of RS transmissions and blockage reporting when the measurement value change does not reach the threshold. The measurement value change may refer to the absolute difference between the current measurement value (e.g., blockage rate or number of blocked beams measured based on the current measurement period) and the previously reported measurement value (e.g., blockage rate or number of blocked beams for a previous measurement period).

In some embodiments, the computation methodology of new rate or periodicity value may be configured for the WTRU. For example, in a "one step always" method, when a measurement value change is found to be greater than the T1 threshold, then the next lower periodicity value may be selected for both the cases (i.e., for RS transmission and blockage reporting). Alternatively or additionally, in a "functional" approach, the new periodicity value may be a configured as a function of the measurement value change. For example, the new periodicity may be defined as shown in Equation 2 below:

$$\text{New periodicty} = \left[ \frac{\text{current periodcity}}{\text{measurement value change} \times \text{step threshold}} \right] \quad \text{Equation 2}$$

In the case there is no periodicity value configured for any set of resources which is equal to the derived new periodicity, the closest value out of the different configured values may be chosen by the WTRU.

In some embodiments, a periodicity threshold 2 (T2) may also be used by the WTRU to determine the periodicity of the resources for RS transmission and blockage reporting. The periodicity threshold 2 (T2) may refer to the number of measurement periods after the activation of the current set of resources for RS transmission and blockage reporting, over which if the measurement value (e.g., blockage rate or number of blocked beams) does not change significantly (e.g., average measurement value change over the last T2 periods is less than or equal to T1), triggers a reduction in the rate of the RS transmission and the blockage reporting (or increasing the periodicity of RS transmissions and blockage reporting). If the measurement value does not change significantly over the last T2 periods, then the next higher periodicity value may be chosen for both the cases (i.e., for RS transmission and blockage reporting). Alternatively or additionally, the new value of periodicity may be configured as a function of number of measurement periods over which the measurement value does not change significantly.

In some embodiments, based on the configured thresholds and the computation methodology, when the WTRU determines to decrease or increase the current periodicity, the WTRU may be configured to switch to a new set of resources for RS transmission and blockage reporting after the transmission of the current/latest measurement value. In some cases, the WTRU may perform the switch to the new set of resources upon being configured with the new periodicity value. For example, if the current or latest blockage reporting is configured to be sent using the uplink control channel or UCI in slot 'n', the WTRU may assume that it should begin using the new set of resources (i.e., for RS transmission and the blockage reporting) following a timing offset. In one example, in slot 'n+K1', where K1 may be a timing offset communicated to the WTRU, e.g., as a part of the beam blockage reporting configuration or RS configuration. Different offsets may be configured for RS configuration and blockage reporting. For instance, a timing offset K1 for may be applied for the RS configuration and a timing offset K2 for blockage reporting. After the transmission of blockage report in slot 'n', the WTRU may deactivate the current RS transmission and backscatter measurements and/or reporting.

Alternatively or additionally, if the blockage reporting is configured to be sent using the uplink shared channel (e.g., PUSCH), the WTRU may assume that it should begin using the new set of resources (i.e., for RS transmission and the blockage reporting) from slot 'n1+K3', where 'n1' is the slot in which the WTRU receives a downlink acknowledgement for the PUSCH providing the current/latest blockage report, and K3 may be communicated to the WTRU, for example, as a part of the beam blockage reporting configuration or RS configuration. The downlink acknowledgement may be, for instance, a Hybrid Automatic Repeat Request Acknowledgement (HARQ-ACK), or DCI having format DCI 0_0 or DCI 0_1 with a new data indicator (NDI)='1' for the HARQ process used for the report transmission. In some embodiments, the WTRU may assume that the starting of new set of resources (i.e. for RS transmission and the blockage reporting) may be applied from 'n+drx-RetransmissionTimerUL' slot, where the latest blockage report is sent in slot 'n' using PUSCH.

Figure 5:
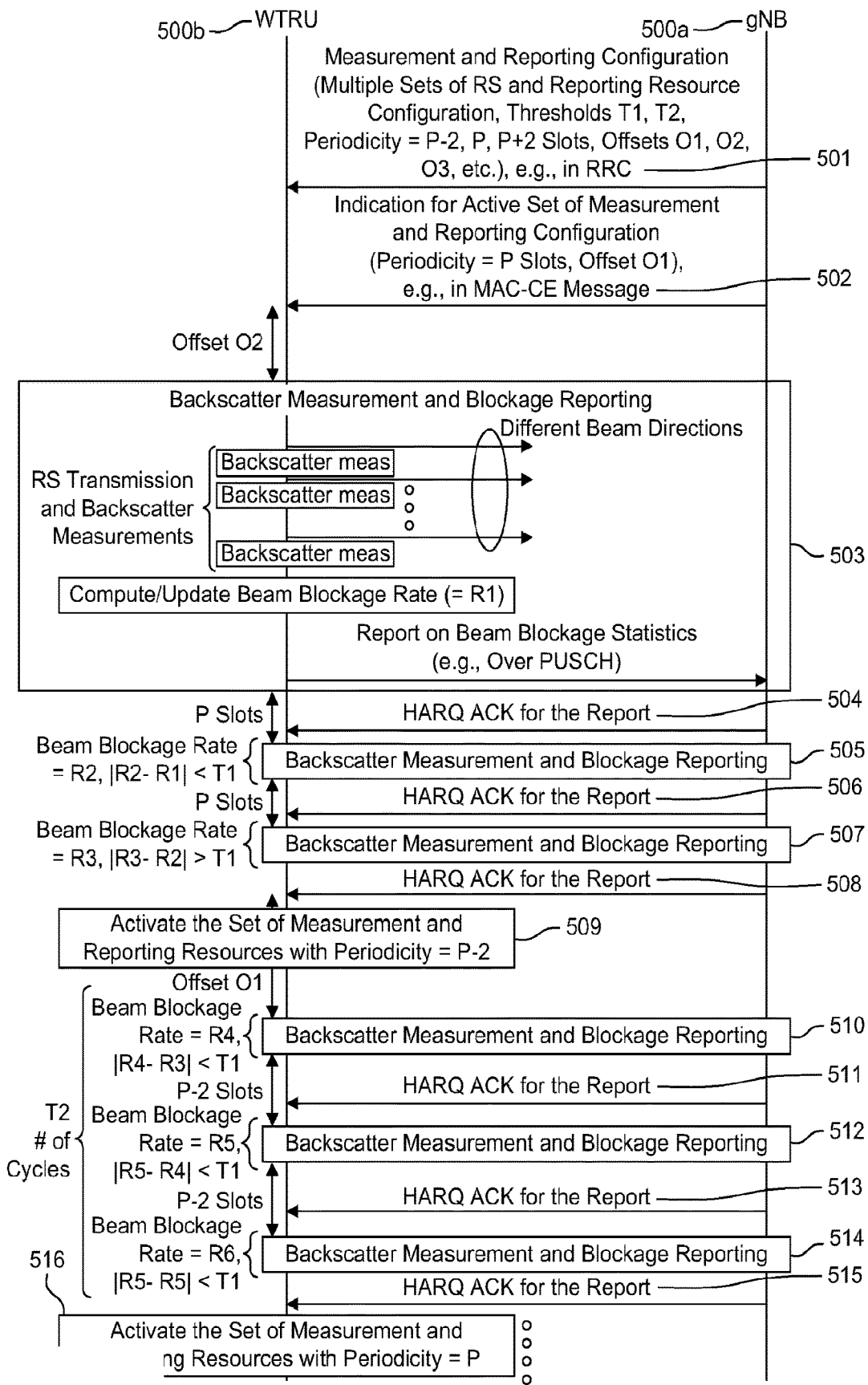
FIG. 5 is a diagram illustrating an example of implicit re-configuration of measurement and reporting periodicity.

FIG. 5 is an example of implicit reconfiguration of measurement and reporting periodicity. As shown in FIG. 5 at 501, a WTRU 500b may receive a measurement and reporting resource configuration from a gNB 500a, As shown, the measurement and reporting configuration may include multiple sets of RS configurations for backscatter measurements along with multiple sets of reporting configurations (sets with different periodicity P−2, P, P+2), thresholds T1 and T2, and offsets O1, O2, and O3. As is the case in FIG. 5, the periodicity values may be explicitly configured for a "one step only" system. The measurement and reporting configuration may be received by the WTRU 500b in RRC signaling. In embodiments as shown at 502, the gNB 500a may transmit an indication to the WTRU 500b to activate measurement and reporting using a subset of resources and parameters that were previously configured (e.g., set of RS configuration and set of reporting configuration with periodicity=P). The indication may be provided via a MAC-CE, as shown in FIG. 5. At 503, the WTRU 500b may perform backscatter measurements for each RS repetition using different beam directions and compute or update a first beam blockage rate, which may be expressed as R1. In embodiments as shown in FIG. 5, the WTRU 500b may commence the backscatter measurement and blockage reporting following a time offset (e.g., O2) from receipt of the indication 502. The specific offset to be used may be indicated in the MAC-CE used for activation at 502. After computing or updating the beam blockage rate, the WTRU 500*b* may transmit a report containing the beam blockage statistics, for example, over a PUSCH. At 504, The gNB 500*b* may transmit an acknowledgement to the WTRU 500*a* upon receiving the report.

At 505 and 507, the WTRU 500*b* may again perform backscatter measurement and blockage reporting based on the periodicity, P indicated in the MAC-CE message at 502. In each instance, the WTRU 500*b* may evaluate a current beam blockage rate (e.g., R2 and R3) in relation to the previously determined beam blockage rate (e.g., R1 and R2, for steps 505 and 507 respectively) and determine whether to adjust the measurement and reporting periodicity based by comparing the change in beam blockage rate to threshold T1. The WTRU 500*b* may transmit reports including the determined statistics, and upon receiving the reports, the gNB 500*a* may again transmit acknowledgements, shown at 506 and 508.

If the WTRU 500*b* determines that the change in beam blockage rate exceeds a configured threshold, the WTRU 500*b* may determine to increase the measurement and blockage reporting rate (i.e. decrease the periodicity). For instance, as shown at 509, the WTRU 500*b* may activate a set of configured measurement and reporting resources and determine to use a periodicity value of P−2 slots and an offset value O1. The WTRU 500*b* may commence backscatter measurement and blockage reporting in the configured resources at 5010 following the time offset O1 and again at 512 and 514 according to the configured periodicity of P−2 slots. In embodiments as shown at 511, 513, and 515, the WTRU may receive acknowledgements for the reports from the gNB 500*a*, The WTRU 500*b* may monitor the change in beam blockage rate over a number of successive measurement periods equal to periodicity threshold T2. If an average change in the rate beam blockage over the successive measurement periods is sufficiently low (e.g., does not exceed threshold T1), the WTRU 500*b* may determine to reduce the frequency with which to perform backscatter measurement and blockage reporting. Hence, the WTRU 500*b* may again adjust the measurement and reporting frequency by activating/deactivating one or more sets of measurement and reporting resources and parameters, as shown at 516.

Figure 6:
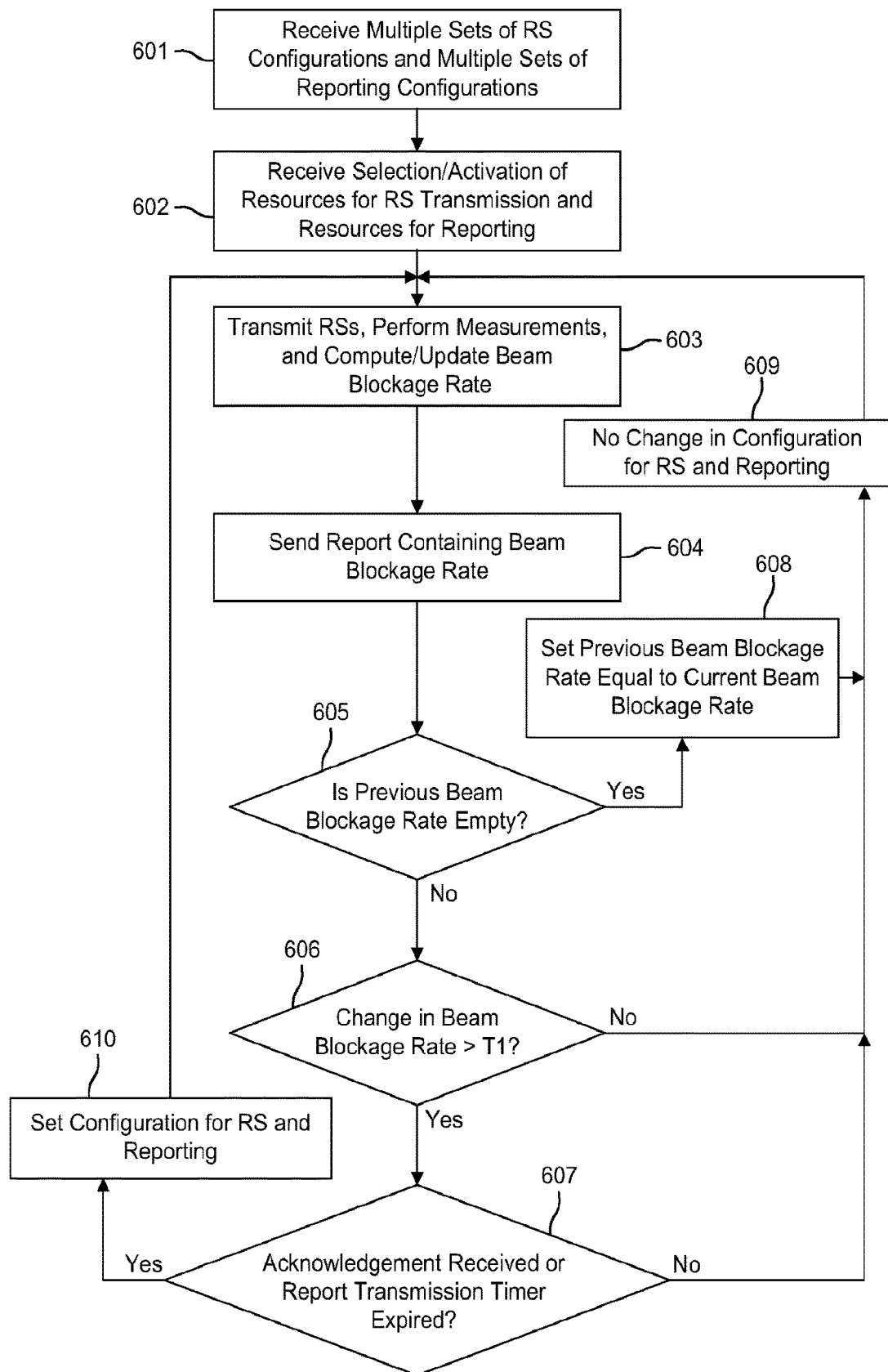
FIG. 6 is a diagram illustrating an example WTRU procedure for implicit periodicity change of measurement and reporting configuration.

FIG. 6 is an example procedure performed by a WTRU for adjusting measurement and reporting periodicity. As shown at 601, the WTRU may receive an RRC configuration message with multiple sets of RS configurations for backscatter measurements along with multiple sets of reporting configurations (with different periodicity). The RRC configuration message may include one or more periodicity threshold values (e.g., T1 in the context of FIG. 6), and an indication to use the 'one step always' computation methodology for adjusting measurements and reporting. At 602, the WTRU may receive a selection or activation of one of the sets of RSs and one of the sets of reporting configurations. The selection or activation may be signaled to the WTRU, for example, in a MAC-CE message. Based on an initial selection or activation, the WTRU may further set a parameter for the previous beam blockage rate equal to 'empty'. At 603, the WTRU may perform RS transmissions on the next configured resources, make backscatter measurements, and compute or update the current beam blockage rate. The WTRU may send, at 604, a report containing the beam blockage rate on the next configured uplink resources. A transmission on the next uplink resources may be performed, for example, on a PUSCH.

At 605, the WTRU may evaluate whether the previous beam blockage rate is or is not 'empty'. If it is 'empty', the WTRU may set the previous beam blockage rate equal to the current beam blockage rate (shown at 608), and may determine that no change from the current configuration for RS transmission and reporting is necessary (shown at 609). If the previous beam blockage rate is not 'empty', the WTRU may then proceed to determine, at 606, if the change in beam blockage rate (e.g., the difference between the current beam blockage rate and the previous beam blockage rate) exceeds threshold T1. If not, the WTRU may again determine (e.g., at 609) that no change in configuration for RS transmission and reporting is to be performed. If the change in beam blockage rate does exceed threshold T1, the WTRU may proceed to determine, at 607, if an acknowledgement (e.g., HARQ-ACK, in DCI format 0_0 or DCI 0_1 with NDI=1) for the measurement report has been received, or alternatively, if a timer for requesting retransmission (e.g., drx-RetransmissionTimerUL, corresponding to a HARQ process used for report transmission) has expired. If an acknowledge has been received, or if a timer for requesting retransmission has expired, at 610, the WTRU may adjust the RS and reporting configuration with the next lower of the configured periodicities, relative to the current periodicity.

Figure 7:
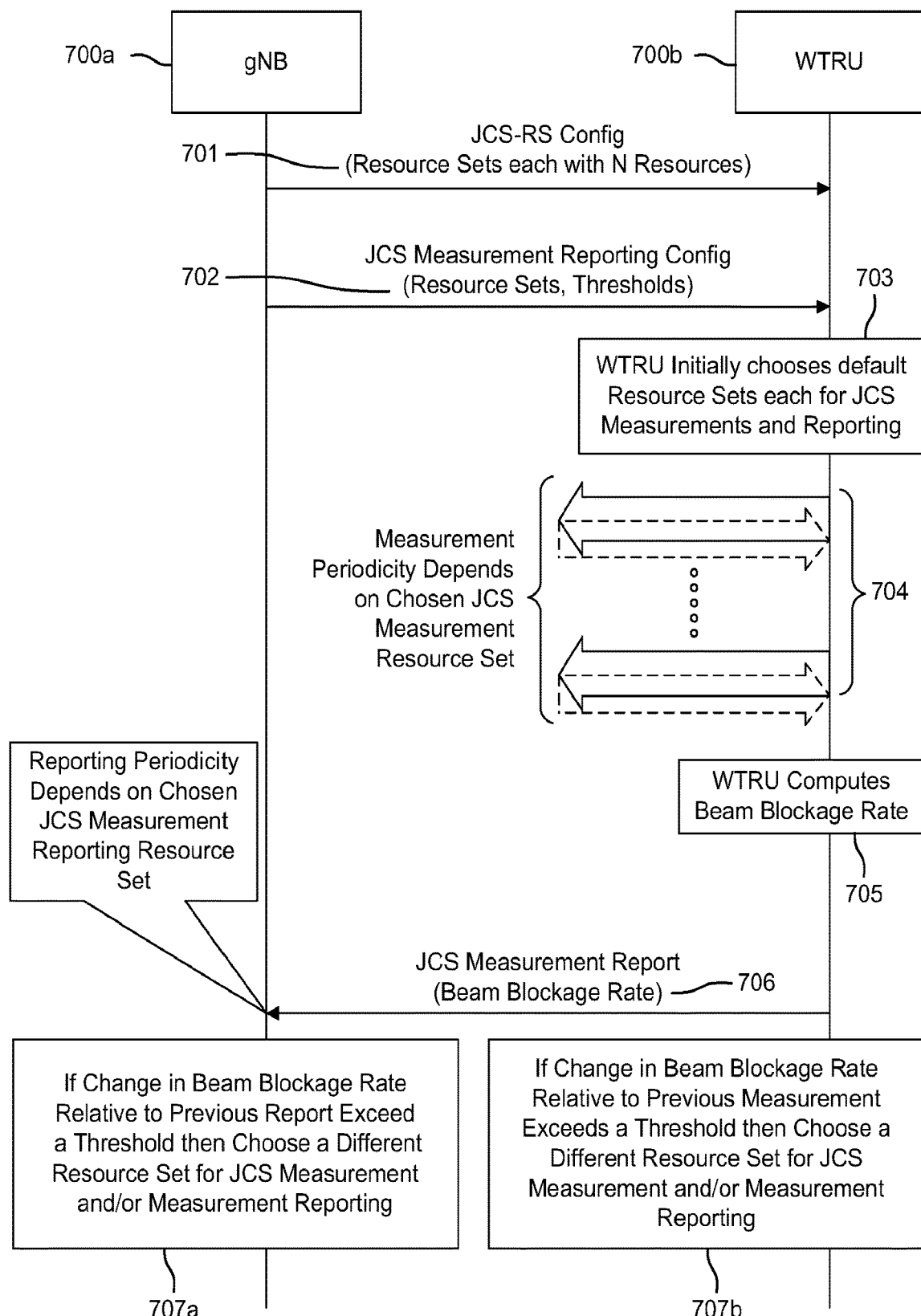
FIG. 7 is a diagram illustrating an example procedure for coordinated resource configuration switch at a gNB and WTRU based on implicit signaling.

FIG. 7 is an example of a procedure for enabling resource configuration adjustment at the WTRU without explicit signaling in the context of joint communication and sensing (JCS). As depicted in FIG. 7 at 701, a WTRU 700*b* may receive a JCS-RS configuration from a gNB 700*a*. The JCS-RS configuration may specify one or more resource sets each with N resources. At 702, the WTRU 700*b* also receives a JCS measurement reporting configuration, which may include one or more resource sets for transmitting the measurement reports and/or one or more thresholds for adjusting the JCS-RS measurement and reporting configuration. At 703, the WTRU 700*b* may determine a default resource set for JCS measurements and a default resource set for reporting. At 704, the WTRU 700*b* may transmit JCS-RS using a number of beams that is, for example, equal to the number of resources specified at 701 in the JCS-RS configuration. The WTRU 700*b* may measure backscatter power on corresponding Rx beams at a given periodicity. The periodicity may depend on the JCS measurement resource set determined at 704. Based on the measured backscatter power, the WTRU 700*b* may compute the beam blockage rate (shown at 705) and, at 706, transmit a JCS measurement report that may include the beam blockage rate. Similar to the measurement periodicity, the reporting periodicity may depend on the selected JCS reporting resource set. In this example, based on the WTRU JCS measurement report, the gNB 700*a* and WTRU 700*b* may determine a configuration change, adjustment, or switch, shown at 707*a* and 707*b*. In some embodiments, the WTRU 700*b* or the gNB 700*a* may determine the change independently. For example, if the gNB makes the determination (e.g., based on a received measurement report), the gNB may indicate the change to the WTRU. If the WTRU makes the determination independently or implicitly, it may initiate the change in resources without input from the gNB. An adjustment to the configuration may be prompted if the current measurement varies from the past L (>=1) values by a significant amount. The WTRU may be configured with thresholds to determine when a configuration change is required. It is noted that both the thresholds and the number of times the thresholds that need to be exceeded (L) before a configuration switch is triggered may be different for the two cases when the current measurement is more or less than the previous measurements. The parameter L may be configured at the WTRU by a gNB via, for example, via the JCS-RS configuration at 701, via another signal received from the gNB during resource configuration adjustment, or separately via, e.g., RRC or other control signaling.

Embodiments for explicit signaling for re-configuration of backscatter measurement and blockage reporting are described herein. In some embodiments, a WTRU may determine to reconfigure one or more parameters for RS resources and/or blockage reporting based on one or more factors. For example, the WTRU may determine higher or lower rates of measurement and reporting (e.g., compared to the rate of active resources) are necessary based on the WTRU's mobility or a change in the measurement value (e.g., similar to mechanisms described above). In some embodiments, the WTRU may determine higher or lower values for repetition are necessary (i.e. a higher or lower number of symbols or beams should be allocated for RS transmission in a period), or a change in frequency granularity of measurement based on the resolution of measurement values (e.g., a received power of backscatter) is needed.

In some embodiments a WTRU may be configured to send a request to the network (e.g., gNB/eNB/BS) to indicate reconfiguration of RS resources for backscatter measurements or/and resources for reporting is necessary. A multi-bit field may be used by the WTRU to indicate the request, in which multiple bits (e.g., two bits) may be dedicated to each parameter that may be reconfigured. For example, the two bits corresponding to a parameter, i.e., '00', '01', '10', may indicate that no change is required, or to decrement or increment, the current value of that parameter, respectively. The uplink resources to send an indication to the network may be allocated with the reporting resources. For example, based on the determination to modify one or more parameters, the WTRU may prepend the multi-bit value (i.e. setting the value as per the requirement) to the current report.

After sending an indication or request for reconfiguration to the network, the WTRU may monitor for a reconfiguration message (e.g., re-configuration of the current resources for measurement and/or reporting) from the network. For example, the WTRU may receive a reconfiguration in a RRC reconfiguration message. Alternatively or additionally, the WTRU may receive a MAC-CE message or DCI containing the an indication to activate a new set of resources (e.g., out of multiple sets configured in RRC configuration). In some embodiments, the MAC-CE message or DCI may also contain an indication (e.g., implicitly or explicitly) to deactivate the previous active resources.

Embodiments for triggered reporting are described herein. To perform backscatter measurement-based blockage reporting, a WTRU may be configured with an event-based trigger. For example, for blockage reporting, an event may be configured, and when this event occurs or is triggered, the WTRU may send a measured value to the network. For example, an event may be configured such that, if the backscatter measurement (e.g., beam blockage rate) is varied by or exceeds a triggering threshold, then the event triggering condition is fulfilled, and, therefore, a measurement report containing the current measured value may be reported to the network (e.g., gNB/eNB/BS). The variation in the measurement value may refer to the absolute difference between the current measurement value (e.g., blockage rate or number of blocked beams measured based on the current measurement period) and the previously reported measurement value (e.g., blockage rate or number of blocked beams). In another example, the WTRU may be configured to monitor multiple measurements, if all the multiple measurements or a derived value using all the multiple measurements vary with the previously reported measurement by a triggering threshold, then the event triggering condition may considered as fulfilled. In some embodiments, the multiple measurements to be monitored may encompass a number of measurements over a configured time period (i.e., a "time-to-trigger"), and the derived value may be an average of the measurements.

In some embodiments, an RS transmission for measurement may also be triggered based on an event. For example, the WTRU may transmit JCS-RS on the configured resources when WTRU movement/rotation is sensed, which may be possible using, for example, in-device gyroscope, accelerometer, etc. In some embodiments, the configuration of triggered reporting with event definition, and other parameters (e.g., triggering threshold, time-to-trigger) may be communicated to the WTRU, for example, in RRC signaling (e.g., an RRC configuration).

After the event triggering condition is fulfilled, the WTRU may transmit a report containing the latest measured value to the network. The WTRU may send the report using an uplink channel (e.g., PUSCH). If the WTRU does not have any uplink resource available, the WTRU may send a scheduling request to receive a grant for the resources. Alternatively or additionally, the backscatter measurement based blockage reporting may be configured as layer 3 (L3) event-based triggered reporting. The WTRU may send the measurement report using an uplink L3 message, which may be, for example, an RRC message.

Figure 8:
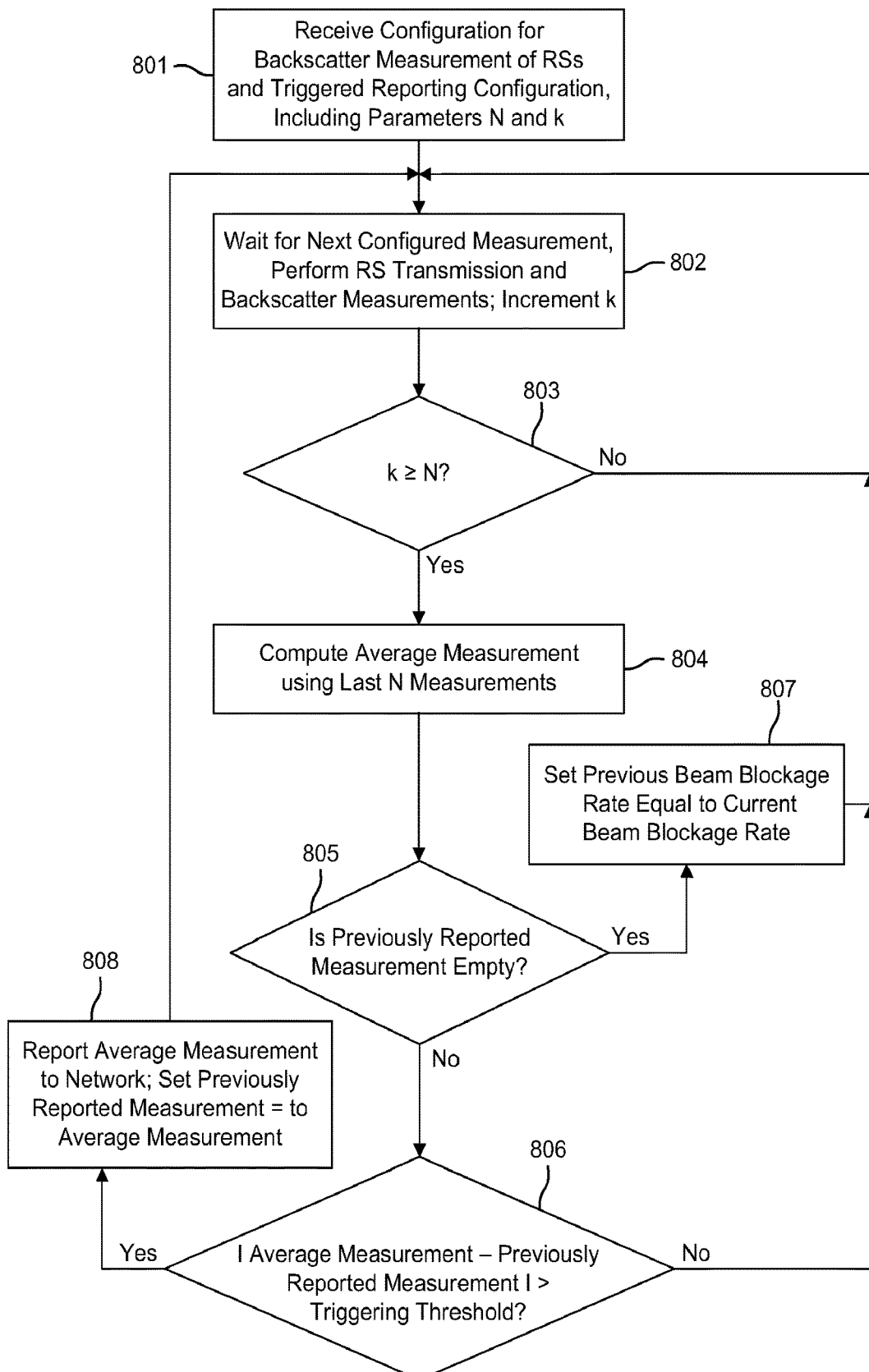
FIG. 8 is a diagram illustrating an example WTRU procedure for triggered reporting.

FIG. 8 illustrates an example of a WTRU procedure for triggered reporting. At 801, a WTRU configured to perform the procedure may receive a configuration for backscatter measurement of RSs. The configuration may further include a triggered reporting configuration, which may provide, for example, an event definition, a triggering threshold, and a number of measurement periods, N, that may be used to trigger reporting. Upon receiving the configurations, the WTRU may set a parameter, k, equal to the number of measurements that have been performed. If no measurements have yet been performed, the WTRU may set k equal to 0, and set another parameter, 'previously reported measurement' equal to 'empty', indicating that no measurement has yet been reported. At 802, the WTRU may wait for the next configured measurement, perform RS transmissions on the configured resources, perform backscatter measurements and/or store the resulting values. The WTRU may increment the parameter k by one to indicate that a measurement has been performed. At 803, the WTRU may evaluate whether the number of measurements performed, k, is equal to or greater than the number of measurements or periods used to trigger reporting, N. If not, the WTRU may again perform the procedures as described at 802 and perform, record, and store measurements for a next RS transmission. If k meets or exceeds N, the WTRU may, at 804, compute an average value of the measurements for the N periods in which measurements were performed. At 805, the WTRU may evaluate whether the 'previously reported measurement' field is 'empty'. If so, at 807, the WTRU may set the previously reported measurements field equal to the average measurement computed at 804. If not, the WTRU may evaluate, at 806 whether the difference between the average measurement computed at 804 and the value of the parameter 'previously reported measurement' exceeds the configured triggering threshold. Finally, as shown at 807, the WTRU may be configured to average the measurements over the N periods, and if the average varies from the previously reported measurement by more than 'triggering threshold', then the WTRU may send a report to the network, shown at 808. The WTRU may also set the parameter 'previously reported measurement' equal to the average measurement computed at 804.

Embodiments for implicit re-configuration of CSI-RS/SRS resources are described herein. In some embodiments, blockage reporting (e.g., measurements of beam blockage rate or number of blocked beams) based on the backscatter measurements from a WTRU may be used by the network for efficient resource management. For example, a number of CSI-RSs configured within a CSI-RS set (e.g., the number of CSI-RSs configured with the parameter "repetition=ON") may be updated based on the beam blockage rate. In another example, a number of SRS (i.e. the number of beams used of SRS) may be updated based on the beam blockage rate from the WTRU.

In some embodiments, after blockage reporting, a WTRU may be configured to update a downlink and/or uplink reference signal (e.g., downlink CSI-RS or uplink SRS) configuration, which may be different from the active reference signal configuration. A WTRU may be configured with multiple sets of reference signals, for example, multiple CSI-RS resource sets (with "repetition=ON") with varying number of CSI-RS resources, or/and, multiple SRS resource sets with varying number of SRS resources. If the WTRU determines that the current reported value (e.g., beam blockage report) is different from the previously reported value, the WTRU may select a new CSI-RS resource set and/or SRS resource set from the multiple configured resource sets. For example, the WTRU may compute the number of required CSI-RS resources as the difference between the WTRU's maximum Rx beam capability and the reported value of beam blockage rate. Based on the computed number of required CSI-RS resources, the WTRU may choose the resource set which has same or closest number of CSI-RS resources as the calculated number of required CSI-RS resources.

If the blockage reporting is configured to be sent using an uplink control channel or UCI in a given slot 'n', the WTRU may assume that it may commence using the new set of resources (i.e., CSI-RS resource set with 'repetition=ON' or/and SRS resource set) beginning in slot 'n+L1', where L1 is an offset that may be communicated to the WTRU, for example, as a part of the beam blockage reporting configuration or CSI-RS/SRS configuration. Different offsets may be configured for different RSs (e.g., one of CSI-RS and another one for SRS).

Alternatively or additionally, if the blockage reporting is configured to be sent using an uplink shared channel (e.g., PUSCH), the WTRU may assume that it may commence using the new set of resources (i.e. a CSI-RS resource set with 'repetition=ON' and/or an SRS resource set) beginning in slot 'n1+L2', where 'n1' is the slot in which the WTRU receives a downlink acknowledgement for the PUSCH providing the latest blockage report. The downlink acknowledgement may be a HARQ-ACK or DCI with format DCI 0_0 or DCI 0_1 with NDI='1' for the HARQ process used for the report transmission. L2 may be communicated to the WTRU, for example, as a part of the beam blockage reporting configuration or CSI-RS/SRS configuration. In another embodiment, the WTRU may assume that it may commence using the new set of resources beginning in the next slot after the maximum duration until a grant for UL retransmission may be received. This may be, for example, when a timer (e.g., drx-RetransmissionTimerUL) has expired for the HARQ process of the PUSCH over which the latest blockage report is transmitted.

In some embodiments, the WTRU may deactivate the current active configuration and may activate the new configuration received explicitly from the network, e.g., when the WTRU receives an explicit command (e.g., in RRC signaling, in a downlink MAC-CE, or DCI) from the network containing the selection or activation of a CSI-RS resource set and/or SRS resource set.

Embodiments for sensing-assisted beam selection are described herein. In addition, embodiments for blockage rate-based beam selection are further described herein for sensing assisted beam selection.

A WTRU may be configured to compute and report blockage statistics for one or more Tx beams of a gNB (e.g., serving g NB/TRP). For example, the WTRU may be configured to compute and report a beam blockage rate for one or more Tx beams of its serving gNB. A Tx beam may be identified according to the Synchronization Signal Block (SSB) transmitted over that beam, where each SSB is allocated an index. In order to compute blockage statistics for one or more Tx beams of a gNB, the WTRU may be configured with an uplink RS configuration (e.g., for the purpose of sensing only, or for the purpose of joint communication and sensing) for backscatter measurements corresponding to each of the Tx beams (or SSB identifiers or indices) for which the blockage statistics need to be computed. In addition to the parameters mentioned for uplink RS configuration for backscatter measurements described above, one or more parameters may be defined for mapping or linking the Tx beams and the corresponding uplink RS transmissions for backscatter measurements. The parameters may include, for example, a max duration and/or maximum displacement (e.g., lateral and/or angular displacement) between a downlink channel (containing SSB) measurement and a corresponding backscatter measurement for it to be counted.

In some embodiments, a WTRU may be configured with one or more parameters to perform reporting. The reporting may be configured as periodic, semi-persistent, or aperiodic reporting. For each of the reporting configurations, the parameters may include, but are not limited to: a reporting quantity (e.g., beam blockage rate or Rx signal strength); indices of the SSBs (e.g., TX beams) for which the reporting needs to be performed; time-frequency resources, for example, using a PUCCH or PUSCH, which may include periodicity and offset, symbols indices or starting symbol and number of contiguous symbols, PRB indices or starting PRB and number of contiguous PRBs; a frequency granularity, (e.g., a wideband versus a sub-band configuration); one or more parameters associated with measurement, such as a detection threshold); or N (i.e., a number of measurements with which to derive average statistics).

The reporting configuration may be communicated to the WTRU, for example, in RRC signaling (e.g., via an RRC configuration message) or system information. Alternatively or additionally, the given reporting configuration may be activated or deactivated later by sending an activation or deactivation command using the downlink control channel (e.g., using downlink control information (DCI) scrambled or masked with the WTRU's RNTI).

Alternatively or additionally, the reporting of beam statistics for one or more Tx beams may be multiplexed with an existing CSI report in which the WTRU is configured to send RSRP measurements on one or more SSBs to the network. For each of the configured gNB's Tx beams (e.g., for which the blockage statistics need to be captured), the WTRU may transmit RSs on the configured resources and perform backscatter measurements. For example, the WTRU may measure an Rx signal strength, or perform cross-correlation with a known WTRU sequence. If the WTRU is configured to compute the beam blockage rate, the WTRU may take multiple measurements (e.g., equal to N) and compute average statistics using the multiple measurements. The average statistics may be, for example, a simple average or median, or an exponential moving average. Based on the configuration, the WTRU may make measurements both for wideband and one or more sub-bands. The WTRU may send derived blockage statistics for the each of configured Tx beams on the configured resources for reporting.

The network (e.g., gNB/eNB/BS) may use the beam blockage statistics for each of the configured Tx beams received in a report from a WTRU to determine the best Tx beam for the WTRU and, in some embodiments, the best Rx beam as well. For example, the network may use a metric that is a function of the downlink RSRP and the beam blockage rate measured at the WTRU in order to select the best beam for that WTRU.

Embodiments for network biased beam selection are further described herein for the sensing-assisted beam selection. WTRU Tx beam selection may be based on a combination of uplink signal quality (e.g., RSRP, etc.), JCS measurements performed by WTRU, and a set of one or more bias values configured at the WTRU. The WTRU may use the JCS backscatter measurements and the configured bias values while determining the Tx beams for which the WTRU will send RSs (e.g., SRS) on for uplink beam selection. The WTRU may use either the JCS backscatter measurements or the configured bias values or a combination of the two in filtering out beams to evaluate for uplink transmission.

The gNB may select the preferred WTRU Tx beam based on uplink signal quality measurements on the reduced number of beams used by WTRU for uplink beam selection. The gNB may signal the preferred/selected WTRU Tx beam using an appropriate downlink channel configuration (e.g., DCI) in the downlink common channel transmission (e.g., PDCCH).

Bias values may be configured per WTRU Tx beam. The bias values may be determined based on one or more of: an observed interference due to WTRU Tx beam, a current resource utilization on the corresponding gNB Rx beam, or the like. A WTRU may use one of multiple possible alternatives in combining the backscatter measurements and individual bias value per beam such as: sum, weighted sum, max, or the like. For example, WTRU may add the multiple values (e.g., two values) to determine the suitability of a particular beam for uplink transmission. If the computed metric exceeds a configured threshold, then the WTRU may skip RS transmission on the beam for Tx beam selection. In some embodiments, the per beam bias values, and thresholds may be communicated to the WTRU, for example, in system information or RRC configuration.

The WTRU may be configured with a single bias value per beam. Alternatively or additionally, the WTRU may be configured with multiple bias values per beam. These values may correspond to different traffic types, or classes, or physical channels. The WTRU may first choose the appropriate bias value per beam, for example, according to the intended application, while determining the final metric used to filter Tx beams for RS transmission.

In some embodiments, A WTRU may perform or support receive beam selection. Specifically, the WTRU may receive a configuration for JCS Reference Signals (JCS-RS). The configuration may include, for example, multiple resource sets, periodicities or the like. The WTRU may also receive a JCS measurement reporting configuration, which may include, for example, multiple resource sets, periodicities, thresholds or the like. For each configured transmit beam, the WTRU may transmit JCS-RSs on or using configured resources of a default resource set and measure backscatter power on corresponding receive beams. The WTRU may then compute the beam blockage rate, which may be defined, for example, as the ratio of the number of beams for which the received backscatter power exceeds a configured threshold to the total number of assessed beams. The WTRU may report the beam blockage rate on one of the configured resource sets. On a condition that the beam blockage rate differs from the previously reported value by a value that exceeds a first threshold, the WTRU may choose a different resource set for subsequent JCS-RS transmission, for example, with a different transmit periodicity. On a condition that the beam blockage rate differs from the previously reported value by a value that exceeds a second threshold, the WTRU may choose a different resource set for next report transmission, for example, with different reporting periodicity.

In some embodiments, such as in network-biased WTRU uplink beam selection, a WTRU may use a combination of bias value and JCS measurement per beam while prioritizing beams for uplink RS transmission for uplink Tx beam selection. Beam blockage rate reporting may be triggered if it exceeds a threshold.

Embodiments for sensing-based beam failure detection are described herein. A WTRU may perform a JCS/radar-like measurement by transmitting a reference signal (e.g., SRS, DMRS, PTRS, similar signal) and estimating the associated backscatter channel. The WTRU may estimate the channel impulse response ($\hat{h}(t)$) using an estimation algorithm (e.g., least squares, or the like), or estimate relevant parameters (e.g., a round-trip-travel time ($\tau_r$), path loss ($\gamma$), or delay spread ($\sigma_\tau$), or similar parameters) of the channel impulse response by other means (e.g., maximum-likelihood, or similar means).

A WTRU may perform these measurements on a single transmit beam or multiple transmit beams and may store measurements for the receive beam based on a variety of criteria (e.g., best Rx beam only, or each Tx/Rx beam pair, or the like). A WTRU may compare these estimated parameters against relevant threshold criteria for the determination of a measurement event. A measurement event may occur, for example, when path loss is below a certain threshold value, or a round-trip-time is within a critical range. The satisfaction of these determination criteria may indicate the occurrence of a JCS sensing event. Alternatively or additionally, JCS sensing events may be determined by comparing JCS measurements on different beams and/or beam pairs. For example, it may be determined that a round-trip travel time of a Tx/Rx beam pair (X,Y) is greater than a round-trip travel time of a Tx/Rx beam pair (U,V). A sensing event may occur if a beam other than the serving beam has a metric of interest (e.g., backscatter channel gain) indicating that the beam would provide better link performance than the current serving beam.

Alternatively or additionally, to limit excessive beam switching, the sensing event may occur if measurement performance exceeds a threshold, for example, if a backscatter channel gain is at least X dB below the backscatter channel gain on the current serving beam. Sensing events may be determined by a single measurement instance or may make use of a current measurement and a combination or selection of the previous beam measurements made on the same beam pair. For instance, a sensing event may occur when a back-scatter channel gain is below X dB for the previous N JCS measurements performed on the Tx/Rx beam pair (U,V)).

Figure 9:
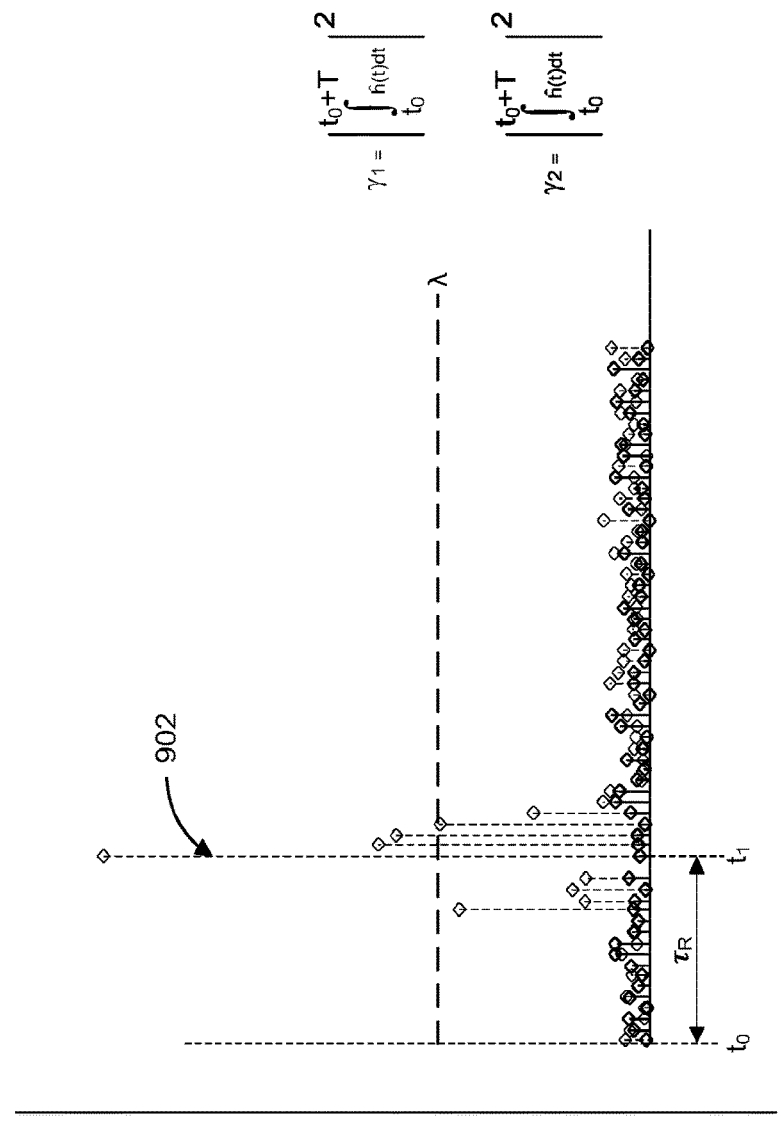
FIG. 9 is a diagram illustrating an example Joint Communication and Sensing (JCS) measurement resulting in sensing event.

FIG. 9 illustrates an example Joint Communication and Sensing (JCS) measurement resulting in a sensing event. In this example, JCS measurements may be performed by a WTRU in two adjacent beams. In performing such measurements, the WTRU may estimate a pathloss $\gamma_1$ and $\gamma_2$ for the two beams respectively. The measurements may indicate the detection of an object 901 on beam 1, for example, if the JCS measurement value 902 is greater than a detection threshold, $\lambda$ as shown in FIG. 9. Alternatively or additionally, integrating the JCS measurement power observed over beam 1 and beam 2 may indicate that the backscatter channel gain on beam 2 is lower than an offset of beam 1, which may indicate another sensing event.

Embodiments for sensing-based beam failure recovery initialization are described herein. A beam blockage event may be defined as the occurrence of a beam measurement that results in a backscatter channel gain estimate above a threshold. The threshold may be static or configured (e.g., via RRC signaling, or the like). The threshold may be dependent on WTRU capability, which may be indicated by the WTRU, for example, in RRC signaling. The threshold may be determined by a quality requirement for the data being transmitted and received. The quality requirement may be, for instance, a Quality of Service (QoS) class identifier (QCI) for a given bearer. A beam blockage event may be based on a single JCS measurement or may be based on a history of measurements made. For example, the event may occur when backscatter channel gain is measured above a threshold for the previous N JCS measurements. The number of historical JCS measurements incorporated in the event determination may be static or configured (e.g., via RRC signaling).

A WTRU may be configured to determine that a given beam is in beam failure if a beam blockage event occurs. Beam failure may be determined from the occurrence of a single beam blockage event or multiple beam blockage events within a configured time range (e.g., N beam blockage events in the past M ms, or a similar time range). In some embodiments, the JCS measurements for beam failure detection may be performed for a configured reference signal, such as when a serving gNB configures a WTRU to perform JCS measurements using SRS and/or JCS-RS transmission and reception. In some embodiments, the JCS measurements for beam failure detection may be performed using reference signals configured for other purposes, such as when a WTRU observes backscatter channel gain from a PDSCH DMRS. A blockage event may be determined from a single RS transmission configuration (e.g., blockage determined by SRS backscatter), or from a combination of multiple JCS measurement configurations (e.g., a combination of blockages detected using SRS transmissions and PDSCH DMRS transmissions). A WTRU may determine that beam failure from a beam blockage event has occurred on a single beam (e.g., a serving beam), or on multiple beams, such as when blockage events occur on a serving beam and adjacent beams. A WTRU may determine beam failure exclusively from beam blockage events or from a combination of beam blockage events and other events. For instance, a WTRU may determine beam failure has occurred based on a combination of beam blockage events and CQI estimated from CSI-RS that is out-of-range. The association of beam blockage events on a given WTRU beam to the transmit/receive beam pair may be configured (e.g., via RRC configurations message), determined through association of relevant beam parameters (e.g., blockage events on beams that are quasi co-located (QCL'ed) with active transmit receive beam pair), or left to the WTRU to determine autonomously.

Figure 10:
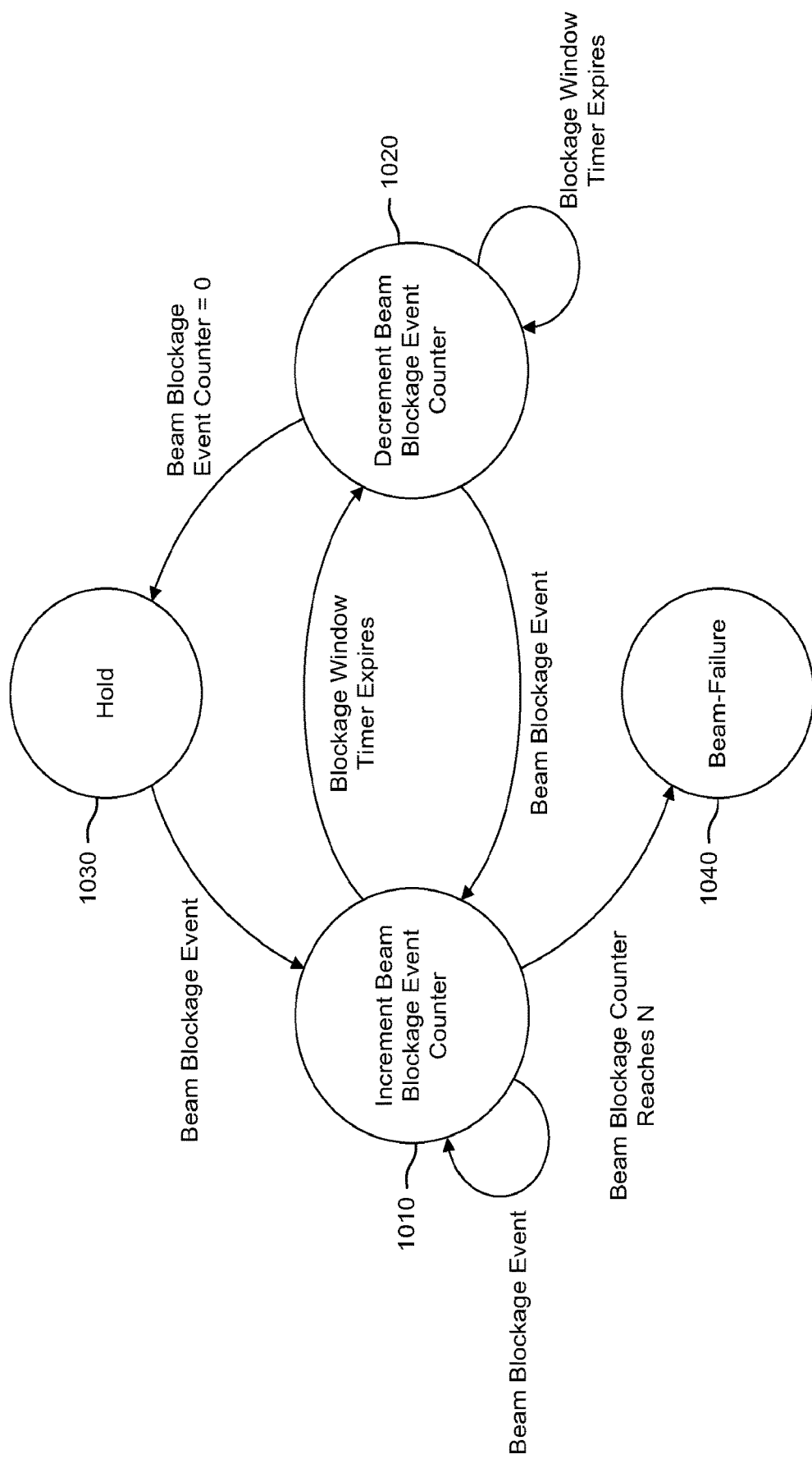
FIG. 10 is a diagram illustrating an example state flow for WTRU using beam blockage events to determine beam failure.

FIG. 10 illustrates an example state flow for a WTRU using beam blockage events to determine beam failure. In this example, a WTRU may be configured with a beam blockage event counter N, and a blockage window timer. When a beam blockage event is observed by the WTRU, as shown at 1010, the WTRU may increment the beam blockage counter and/or initiate a blockage window timer. If the blockage window timer expires before the beam blockage event counter reaches the configured number of beam blockage events, to indicate beam failure, N, the beam blockage event counter may be decremented as shown at 1020. If the beam blockage event counter reaches zero, as shown at 1030, the WTRU state may be held steady until, for example, a subsequent beam blockage event occurs. If the beam blockage counter tallies the requisite N beam blockage events, the WTRU may determine beam failure has occurred, shown at 1040, and initiate beam failure recovery.

Figure 11:
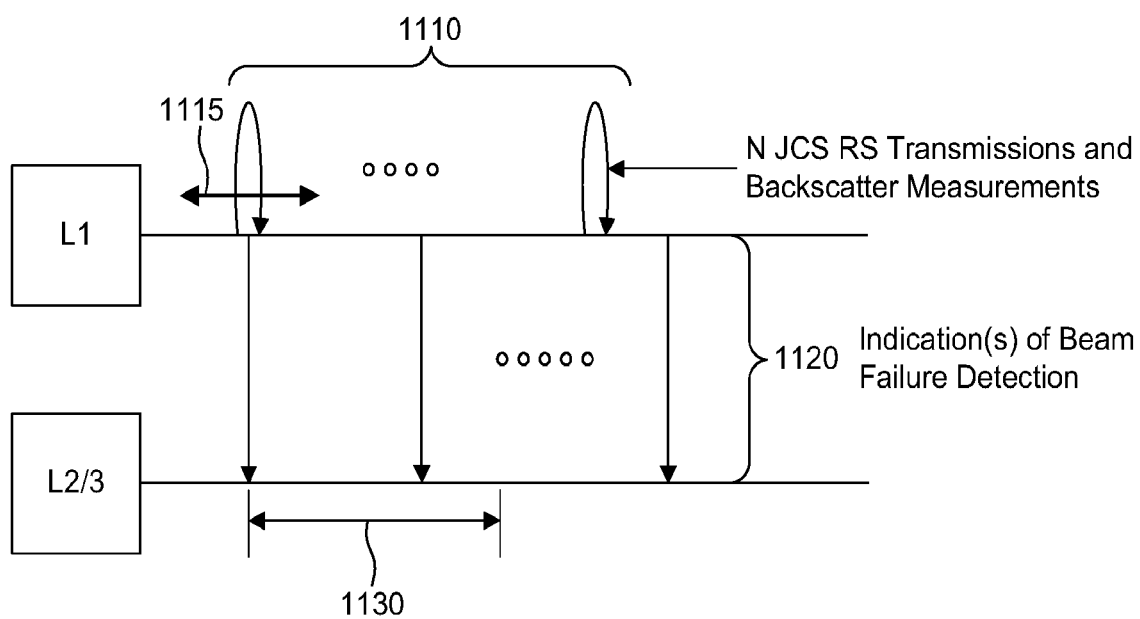
FIG. 11 is a diagram illustrating an example procedure for sensing-based beam failure recovery initiation.

FIG. 11 illustrates an example scenario for sensing-based beam failure recovery initiation, which may also be known as a sensing-based beam detection failure initialization procedure. As shown in FIG. 11 at 1110, a WTRU may use layer 1 (L1) signaling to perform N JSC RS transmissions and backscatter measurements. The N JSC RS transmissions may be performed with a periodicity 1115, which may be based on a maximum periodicity value (e.g., 2 ms, or the shortest periodicity among the configured periodic failure detection resources). Based on the backscatter measurements, the WTRU may determine beam failure has occurred. In some embodiments, as shown, a WTRU may determine that beam failure has been detected when, for all or a subset of the configured periodic resources, a quality measurement (e.g., a QCI for a given bearer, received signal strength, or another metric) is below an 'out-of-sync' threshold. In some embodiments, the quality measurement may be expressed in terms of a number of beam failures, in which case beam failure may be determined when such measurement meets or exceeds a threshold value. At 1120, in one or multiple instances as shown, the WTRU may indicate failure detection to a MAC (L2/L3) function or entity configured at the WTRU. Beam failure detection indication may occur based on one or more timing parameters, which may include a periodicity or an offset value. Upon indication of the detected beam failure, the function may increment a beam failure detection counter. One or more beam failure detection timers may be configured at the function and may define a window 1130. If the window 1130 expires and the function has not received a beam failure detection, the beam failure detection counter may be set to 0. The WTRU may continue performing JSC transmissions and backscatter measurements, and the WTRU may continue to increment the beam failure detection counter. In the event the counter reaches or exceeds a maximum beam failure threshold, the WTRU may be configured to initiate beam failure recovery.

In some embodiments, a WTRU may implement a combined uplink and downlink-based procedure, where beam failure recovery is initialized when a combined metric of the downlink beam quality and uplink quality is greater than a configured threshold. For example, the WTRU may initiate beam failure recovery when the sum of the number of beam failures detected in downlink and the number JCS measurements exceeding a particular value reach a configured level.

Embodiments for sensing-based event reporting are described herein. A WTRU may be configured to report sensing-based measurements, for example, in the event that a measurement report trigger has occurred. A base station (e.g., gNB) may configure a JCS sensing measurement report, with a parameter to configure that the measurement is event triggered. The event trigger configuration may include one or multiple relevant measurement parameters (e.g., backscatter channel gain, round trip time of signal backscatter, power delay profile, or the like). The measurement event may be based on measurement parameters compared against configured thresholds. For example, the WTRU may determine whether a backscatter channel gain is greater than a threshold. The measurement event may be based on measurement parameters compared against similar measurements observed on other beam pairs. For instance, the WTRU may determine that a power delay profile of an adjacent beam is greater than that of a serving beam by an offset. The measurement reports may be configured for events that occur while the WTRU is in RRC-connected mode (e.g., JCS measurements over dedicated WTRU resources), or while the WTRU is RRC-Inactive/Idle mode (e.g., performing autonomous JCS measurement in or out-of-band). The WTRU may determine an event trigger based on a single JCS measurement or on a combination of a history of JCS measurements.

Embodiments for JCS aided beam failure detection are described herein. A WTRU may be configured for JCS-RS transmissions, for example, with one or more parameters including a backscatter power threshold, a blockage count threshold (M), a maximum number of candidate uplink beams (P), or the like. The WTRU may transmit JCS-RSs using configured resources and measure the backscatter power. On a condition that the backscatter power exceeds the threshold M consecutive times, the WTRU may switch to a next uplink beam and transmit a JCS-RS. On a condition that the backscatter power exceeds threshold M consecutive times for all P WTRU uplink beams, the WTRU may initiate beam failure recovery procedure. If downlink channel quality is less than a first threshold N1 consecutive times and JCS backscatter power exceeds a second threshold N2 consecutive times, then the WTRU may switch to the next uplink beam.

Although examples described above may reference technology-specific implementations (e.g., 5G NR), one of ordinary skill in the art will appreciate that the concepts above may be applicable to methods or systems implementing other wireless technologies (e.g., 3GPP Long-Term Evolution (LTE) or IEEE 802 technologies). For example, methods performed by a gNB in conjunction with a WTRU may conceivably be performed by another form of base station (e.g., an eNodeB or other network node, or an AP) in conjunction with a UE, terminal, or station (STA).

Furthermore, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, STA, or any host computer.

What is claimed is:

1. A method performed by a wireless transmit/receive unit (WTRU), the method comprising:
    receiving configuration information indicating resources for receiving a first set of reference signals from one or more transmit/receive points (TRPs) using a first set of receive (Rx) beams, one or more first resource sets for transmitting a second set of reference signals, and one or more second resource sets for reporting sensing information for the second set of reference signals;
    transmitting, in a plurality of spatial directions, the second set of reference signals using one of the one or more first resource sets;
    measuring a backscatter power of at least a portion of the transmitted second set of reference signals;
    reporting sensing information, based on the measured backscatter power of the at least the portion of the transmitted second set of reference signals, using one of the one or more second resource sets, the sensing information including information indicating one or more blockage statistics associated with at least a portion of the plurality of spatial directions; and
    receiving the first set of reference signals from the one or more TRPs using a second set of Rx beams, wherein the second set of Rx beams is determined based on the reported sensing information.

2. The method of claim 1, further comprising determining, based on the sensing information, another one of the one or more first resource sets for transmitting a second set of reference signals; and
    another one of the second one or more resource sets for reporting sensing information for the second set of reference signals.

3. The method of claim 2, wherein the another one of the one or more first resource sets for transmitting the second set of reference signals is determined based on a comparison between the measured backscatter power of each of the at least the portion of the second set of reference signals and a threshold value.

4. The method of claim 2, wherein the one or more blockage statistics include a blockage rate associated with the at least the portion of the plurality of spatial directions.

5. The method of claim 4, wherein the another one of the one or more first resource sets for transmitting the second set of reference signals is determined based on a comparison between the blockage rate and a threshold value.

6. The method of claim 5, wherein the sensing information is reported when the blockage rate exceeds the threshold value.

7. The method of claim 4, wherein the second set of Rx beams is a subset of the first set of Rx beams.

8. The method of claim 2, wherein the one of the first one or more resource sets used to transmit the second set of reference signals is associated with a first transmission periodicity, wherein the another one of the first one or more resource sets for transmitting a second set of reference signals is associated with a second transmission periodicity, and wherein the first transmission periodicity and the second transmission periodicity are different.

9. The method of claim 2, wherein the one of the second one or more resource sets used to report sensing information is associated with a first reporting periodicity, wherein the another one of the second one or more resource sets for reporting sensing information is associated with a second reporting periodicity, and wherein the first reporting periodicity and the second reporting periodicity are different.

10. The method of claim 1, wherein the received configuration information includes information indicating a timing offset between a reception of a message, by the WTRU, and a next transmission of one of the second set of reference signals.

11. A wireless transmit/receive unit (WTRU) comprising:
a processor; and
a transceiver;
the transceiver configured to receive configuration information indicating resources for receiving a first set of reference signals from one or more transmit/receive points (TRPs) using a first set of receive (Rx) beams, one or more first resource sets for transmitting a second set of reference signals, and one or more second resource sets for reporting sensing information for the second set of reference signals;
the transceiver further configured to transmit, in a plurality of spatial directions, the second set of reference signals using one of the one or more first resource sets;
the processor and the transceiver configured to measure a backscatter power of at least a portion of the transmitted second set of reference signals;
the processor and the transceiver further configured to report sensing information, based on the measured backscatter power of the at least the portion of the transmitted second set of reference signals, using one of the one or more second resource sets, the sensing information including information indicating one or more blockage statistics associated with at least a portion of the plurality of spatial directions; and
the transceiver further configured to receive the first set of reference signals from the one or more TRPs using a second set of Rx beams, wherein the second set of Rx beams is determined based on the reported sensing information.

12. The WTRU of claim 11, the processor further configured to determine, based on the sensing information,
another one of the first one or more resource sets for transmitting a second set of reference signals; and
another one of the second one or more resource sets for reporting sensing information for the second set of reference signals.

13. The WTRU of claim 12, wherein the another one of the first one or more resource sets for transmitting the second set of reference signals is determined based on a comparison between the measured backscatter power of each of the at least the portion of the second set of reference signals and a threshold value.

14. The WTRU of claim 12, wherein the one or more blockage statistics include a blockage rate associated with the at least the portion of the plurality of spatial directions.

15. The WTRU of claim 14, wherein the another one of the first one or more resource sets for transmitting the second set of reference signals is determined based on a comparison between the blockage rate and a threshold value.

16. The WTRU of claim 15, wherein the sensing information is reported when the blockage rate exceeds the threshold value.

17. The WTRU of claim 14, wherein the second set of Rx beams is a subset of the first set of Rx beams.

18. The WTRU of claim 12, wherein the one of the first one or more resource sets used to transmit the second set of reference signals is associated with a first transmission periodicity, wherein the another one of the first one or more resource sets for transmitting a second set of reference signals is associated with a second transmission periodicity, and wherein the first transmission periodicity and the second transmission periodicity are different.

19. The WTRU of claim 12, wherein the one of the second one or more resource sets used to report sensing information is associated with a first reporting periodicity, wherein the another one of the second one or more resource sets for reporting sensing information is associated with a second reporting periodicity, and wherein the first reporting periodicity and the second reporting periodicity are different.

20. The WTRU of claim 11, wherein the received configuration information includes information indicating a timing offset between a reception of a message, by the WTRU, and a next transmission of one of the second set of reference signals.

* * * * *